US006407738B1

(12) United States Patent
Wakabayashi

(10) Patent No.: US 6,407,738 B1
(45) Date of Patent: Jun. 18, 2002

(54) METHOD AND APPARATUS FOR ANALYTICAL MODELING

(75) Inventor: Masayasu Wakabayashi, Yokohama (JP)

(73) Assignee: Suzuki Motor Company (JP)

( * ) Notice: Subject to any disclaimer, the term of this patent is extended or adjusted under 35 U.S.C. 154(b) by 0 days.

(21) Appl. No.: 09/464,465

(22) Filed: Dec. 14, 1999

(30) Foreign Application Priority Data

Dec. 14, 1998 (JP) .......................................... 10-354519

(51) Int. Cl.[7] .............................................. G06T 15/00

(52) U.S. Cl. ...................................................... 345/424

(58) Field of Search ................................ 345/419, 424, 345/426, 428, 629, 649, 441

(56) References Cited

U.S. PATENT DOCUMENTS 5,949,424 A * 9/1999 Cabral et al. ............... 345/426

FOREIGN PATENT DOCUMENTS

JP 08-153214 6/1996

* cited by examiner

*Primary Examiner*—Phu K. Nguyen
(74) *Attorney, Agent, or Firm*—Morrison Law Firm

(57) ABSTRACT

The invention involves: a voxel data reading process (step S1) used to read voxel data on the shape of an object of analysis that is defined by the groups of rectangles of voxels; a boundary determination process used to determine whether each voxel contained in the voxel data, which is read in the voxel data reading process S1, belongs to a boundary separating the inside from the outside of the shape of the above-mentioned object of analysis; a connected voxel determination process (step S2) used to recursively determine whether the voxel at each level is connected to the other voxel that is determined to belong to the boundary in the boundary determination process; and a voxel redefinition process used to redefine each voxel, at each level in the groups determined in the above-mentioned connected voxel determination process S2, to the voxel at each level several times wider than the rectangle of a voxel determined to belong to the boundary in the above-mentioned boundary determination process.

9 Claims, 24 Drawing Sheets

PHASE 7 (MODIFICATION OF PLACES WITH 2- OR MORE-LEVEL GAP)

● NODE CONNECTED TO LARGE AND SMALL GRIDS
△ NODE NOT CONNECTED

CONNECTION BETWEEN
A HEXAHEDRAL ELEMENT
WITH 20 NODES AND A HEXAHEDRAL
ELEMENT OF THE SAME SIZE
BUT WITH 8 NODES

● MPC CONSTRAINING NODE
△ MPC CONSTRAINED NODE

METHOD AND APPARATUS FOR ANALYTICAL MODELING

TECHINICAL FIELD

The present invention is concerned with a method and a unit for analytical model formulation, and is particularly concerned with a method and a unit for the formulation of an analytical model used for numerical analysis, such as the finite element method. The present invention is also concerned with the structure of the analytical model data, and with a program for analytical model formulation.

BACKGROUND OF THE INVENTION

A conventional analytical model used for numerical analysis (such as the finite element method) was made using a tetrahedral, (pentahedral), hexahedral element for dividing a shape model defined by CAD into fine elements, which is referred to as element division. In the case of using a tetrahedral element, the element division could be automatically done. However, because a poor analytical accuracy was obtained using the tetrahedral element, it was not preferred. A good analytical accuracy was obtained using a hexahedral element, but element division could not be done automatically. Therefore, research on the dividing position was first undertaken, then each hexahedral element was obtained by manual division.

Use was made of method involving conversion of the shape models defined by CAD to the groups of rectangles referred to as voxel data, and used as hexahedral elements for numerical analysis. Element division could be done automatically with the method. A method for the formulation of voxel data from CAD data was disclosed in Japanese Kokai Patent Application No. Hei 8[1996]-153214.

However, in the above-mentioned conventional examples, because the analytical models were made using a rectangular shaped elements having structure similar to the hierarchical structure, fine rectangles (voxels) had to be used to improve the analytical accuracy, so the number of elements, which was so large that no conventional analytical processing units (software for analysis) could be used for analysis, as well as the size, which could be analyzed, were limited. There were analytical processing units that could be used to analyze an analytical model with the significantly large number. However, as the number of elements increased, the number of computations had to be increased, resulting in reduction of a processing speed.

The objectives of the present invention are to solve the problems of the above-mentioned conventional examples, and to provide a method and a unit for the formulation of an analytical model that can be analyzed using a conventional analytical processing unit while automatic element division is performed using voxel data. Another objective of the present invention is to provide analytical model data that can be used for quick analysis using hexahedral elements while maintaining analytical accuracy.

SUMMARY OF THE INVENTION

Data referred to as an octree is formulated using voxel data as the origin; the octree is used for the formulation of an analytical model in the present invention. Voxels contain and use the following data, i.e., whether a three-dimensional orthogonal lattice (=rectangle) is located inside or outside of the shape data, to display a certain shape. Because a rectangle [rectangular data] displaying a certain shape can be easily converted to an analytical model by directly using the rectangle as a hexahedral element, element division can be automated. However, because a significantly large amount of fine rectangles has to be used to reproduce the details of the original shape, the number (about 190,000 elements) of elements required for analysis using a conventional analytical processing unit may exceed the number of elements that could be processed using a conventional analytical processing unit.

An octree can display a shape using fewer rectangles than the voxel. The number of elements can be reduced using the rectangles of the octree as hexahedral elements, compared with the formulation of an analytical model using voxel data. Hierarchical voxel data are obtained by increasing each rectangle to twice the size, using the previously computed voxel data as the finest element. An analytical model is formulated using the hierarchical voxel data as octree data.

In the case of using neighboring elements having different sizes, a hexahedral element with 20 nodes is used as a large element to maintain the connection between the elements used to formulate an analytical mode. The free nodes between neighboring elements are constrained. When octree data are formulated, a hierarchy with 1 level is maintained to obtain a difference of 1 level or less in size between neighboring elements.

Therefore, the present invention has the following configuration. A voxel data reading process used to read voxel data on the shape of an object of analysis that is defined by the groups of rectangles of voxels [rectangular voxel data]; boundary determination process used to determine whether each voxel contained in the voxel data, which is read in the voxel data reading process, belongs to a boundary separating the inside from the outside of the shape of the above-mentioned object of analysis; a connected voxel determination process used to recursively determine whether the voxel at each level is connected to the other voxel that is determined to be located at the boundary at the boundary determination process; and a voxel redefinition process used to redefine each voxel at each level in the groups determined, in the above-mentioned connected voxel determination process, to be the voxels at each level that are several times wider than the rectangular voxels determined to be located at the boundary in the above-mentioned boundary determination process. The above-mentioned objective is completed by such a configuration.

In the method for analytical model formulation of the present invention, voxel data, which have been previously formulated, are read. The voxels that are located at the boundary or are connected to the boundary are then examined among many voxels. In the case of the outermost layer of voxel data read and located inside the boundary, it was determined that the voxels in the outermost layer are located at the boundary. In the case of the outermost layer located at the boundary, the voxels in the outermost layer are located at the boundary. The outermost layer appears on the surface of the shape of object of the analysis. In the connected voxel determination process, a connection between the voxels located at the boundary through the innermost layer is determined for each level. If the voxels located at the boundary are referred to as level 1, it is determined that the voxels connecting to the voxels in level 1 only are referred to as level 2. The voxels connected to level 2 only are referred to as level 3. In the voxel redefinition process, the voxels located at the boundary are redefined and referred to as the smallest ones. The voxels of all voxel connection levels are redefined according to the levels to obtain octree data. As the width of a rectangle is used to obtain the difference in size between the voxels, a good connection can be easily obtained between the voxels with different sizes.

Analytical model data having the following structure are obtained using a method and a unit for analytical model formulation of the present invention. The analytical model data have the hierarchical structure containing the first level voxels that are located at the boundary separating the inside from the outside of an object of analysis, the second level voxels that are connected to the first level voxels and are wider than the first level voxels, and the n-level voxels that are connected to the m-level voxels and are wider than the m-level voxels. The n-level voxels define nodes connecting to the vertices of the m-level voxels, and contain constraining data used to constrain the nodes at the vertices of the m-level voxels. The analytical model data can be read and analyzed by a computer used for structural analysis of the shape of an object of analysis. The analytical model data are stored in any storage medium and sent to the computer.

Because the groups of voxels showing the shape of an analytical model are hierarchically defined by voxel data consisting of several levels including the first level voxels that belong the surface (boundary) of a shape analyzed in the present invention, in other words, octree data, the computing steps required for analysis using a computer can be reduced due to the small number of octree data when analytical model data are read by a computer, and because small voxels are located near the surface of a shape analyzed in the present invention, a certain analytical accuracy can be maintained, and because analytical model data define nodes connected to the vertices of the m-level voxels and contain constraining data used to constrain the nodes at the vertices of the m-level voxels in the present invention, the structural accuracy is not reduced by defining the shape of a structure using octree data since small voxels are constrained by large voxels at the nodes. Therefore, the present invention can solve the above-mentioned problems.

DETAILED DESCRIPTION OF THE EMBODIMENTS

In the following, the embodiment of the present invention is explained with the figures.

Overall Structure

Figure 1:
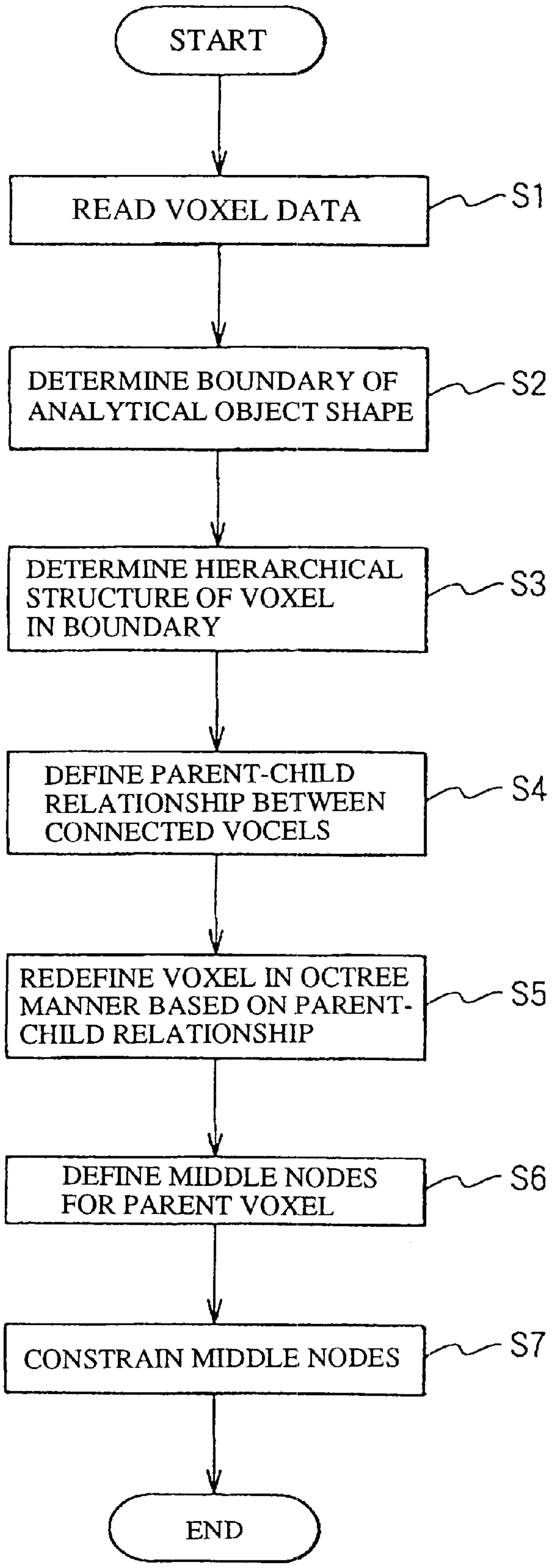
FIG. 1 is a flow chart showing shows the embodiment of the present invention.

FIG. 1 shows an example of a method for analytical model formulation of the present invention. The method for analytical model formulation of the present invention involves: the voxel data reading process used to read voxel data on the shape of an object of analysis that is defined by groups of rectangles of voxels (step S1); the boundary determination process S1 used to determine whether each voxel contained in the voxel data, which is read in the voxel data reading process, belongs to a boundary separating the inside from the outside of the shape of the above-mentioned object of analysis (step S2); the connected voxel determination process used to recursively determine whether the voxel of each is connected to the other voxel that is determined to be located at the boundary in boundary determination process S2; and the voxel redefinition process used to redefine each voxel at each level in the group, which are determined in the above-mentioned connected voxel determination process, to be a voxel at each level and is several times wider than the other voxel, which is a rectangle determined to located at the boundary in the above-mentioned boundary determination process. Therefore, octree analytical model data can be formulated.

In the example shown in FIG. 1, the connected voxel determination process S3 involves the hierarchical structure determination process (step S3) used to determine the type of connection between the above-mentioned voxels, using each level of the hierarchical structure in which each boundary voxel, located in the above-mentioned boundary, is set. It also involves and the parent-and-child relationship determination process (step S4) used to define the relationship between the top and the bottom of the hierarchical structure, determined in the hierarchical structure determination process, i.e., the relationship between a parent voxel and a child voxel. The hierarchical redefinition process (step S5) is used to redefine a parent voxel having a certain relationship with a child voxel, which is the above-mentioned boundary voxel, with the second-level voxel being two times wider than the child voxel, and used to redefine each voxel, based on the second-level or subsequent level parent-and-child relationship. If the connected voxel determination process involves S5, the surfaces of 4 child voxels are connected to one surface of 1 parent voxel, which helps to maintain analytical accuracy.

It is desirable for the voxel redefinition process to involve the node definition process (repeated process) (step S6), following the above-mentioned hierarchical redefinition process S5, and that it be used to define a node for a child voxel at both the edge and on the surface of a parent voxel that is defined in the hierarchical structure redefinition process. It also involves the node constraining process (step S7) used to constrain the node defined in the node definition process S6 based on the other nodes. Thus, practical accuracy can be maintained in the analytical process such as tensile stress analysis with octree data.

Figure 2:
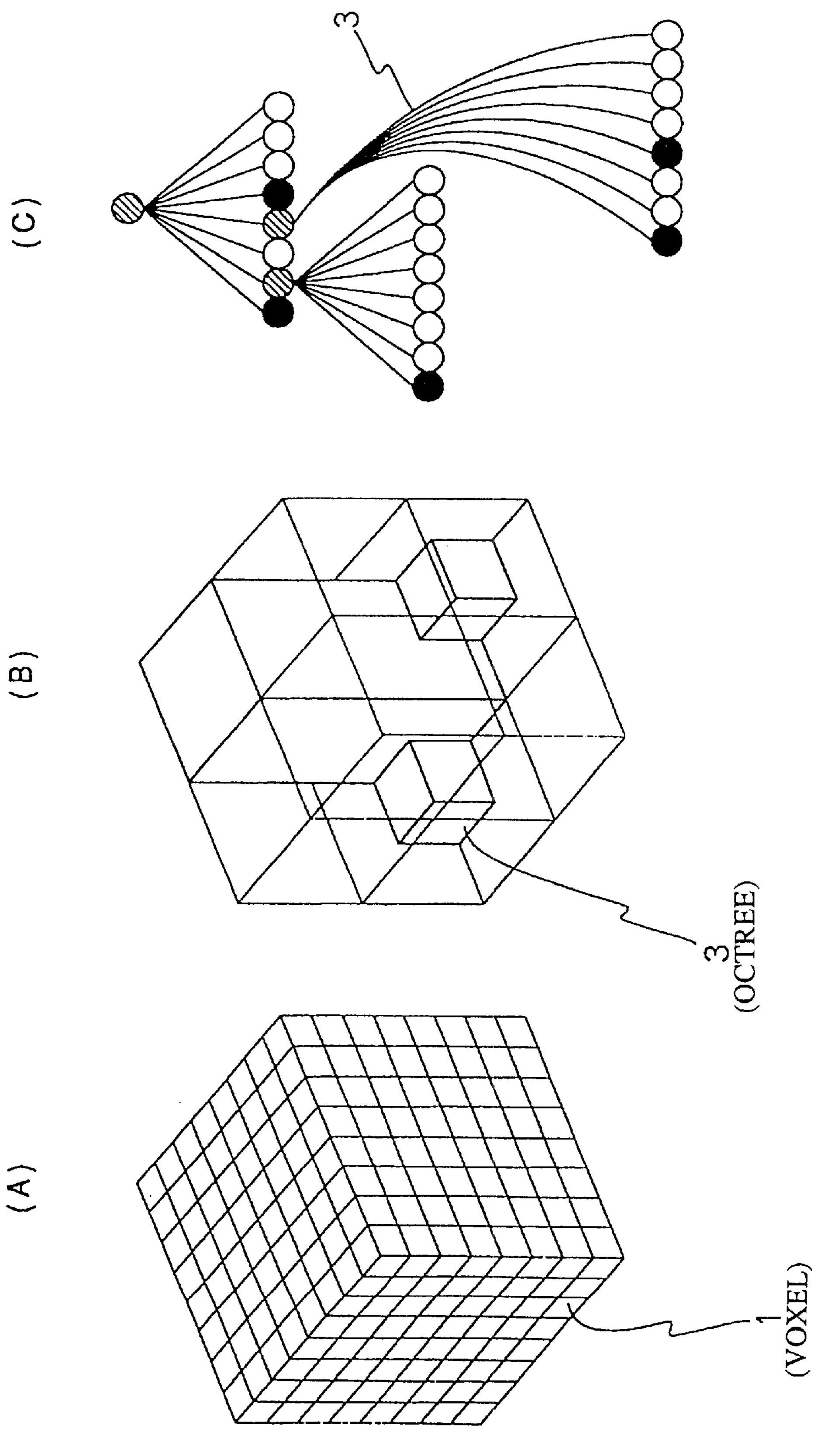
FIG. 2 explains the concept of data used for the process shown in FIG. 1. Part 2(A) shows an example of voxel data, Part 2(B) shows the appearance of octree data, and Part 2(C) shows the structure of octree data.

FIG. 2 shows the images of a voxel 1 and an octree 3. Both a voxel 1 and octree (image voxel) 3 have and use the following data, i.e., whether each three-dimensional orthogonal lattice (=rectangle) is located inside or outside of the shape display. Because voxel data display the shape using the groups of rectangles, it can be easily converted to an analytical model using the rectangles displaying the shape as hexahedral elements. However, the significantly large amount of fine rectangles has to be used to precisely reproduce the original shape. In the case of defining voxel data using rectangles (100 rectangles per edge), a total of 1,000,000 rectangles has to be used. The number of rectangles for a certain shape (depending on the shape) may exceed the maximum number of elements (about 100,000 elements) that can be analyzed by a conventional analytical processing unit.

The octree 3 describes a three-dimensional (3-D) shape constructed with a group of rectangular parallelepipeds obtained by hierarchically dividing the rectangle storing the target shape into eighths. The octree 3 can display a shape using fewer rectangles than voxels 1. A fewer number of elements is required for analytical model formulation of the present invention by converting the rectangles of the octree 3 as hexahedral elements. In the present invention, the data referred to as an octree 3 are formulated using voxel data, with an analytical model being formulated by the octree data. Conversion from the shape model defined by CAD to voxel data can be performed using a conventional method.

The conventional formulation of octree data is now explained. A large rectangle storing the target shape is first used to determine if the rectangle is located inside or outside of the target shape, or at the boundary (partially located both inside and outside). The rectangles determined to be located either inside or outside are not divided to obtain finer rectangles. The rectangles determined to be located at the boundary are divided into eighths (each edge is divided in half). Each of the 8 rectangles is determined to be located either inside or outside, or at the boundary. The rectangles determined to be at the boundary are again divided into eighths. Both the determination and division processes are alternated and repeated many times (determination→division→determination→division . . . ) to divide the boundary, resulting in the formulation of octree data that display a shape using the groups of rectangles with varied sizes (1, ½, ¼, . . . ).

However, it is not easy to create octree data from a shape model defined by CAD. The reason is that rectangle determination (inside or outside of the shape or in boundary) must be performed many times. Thus, octree data are formulated using voxel data in the present invention.

Figure 3:
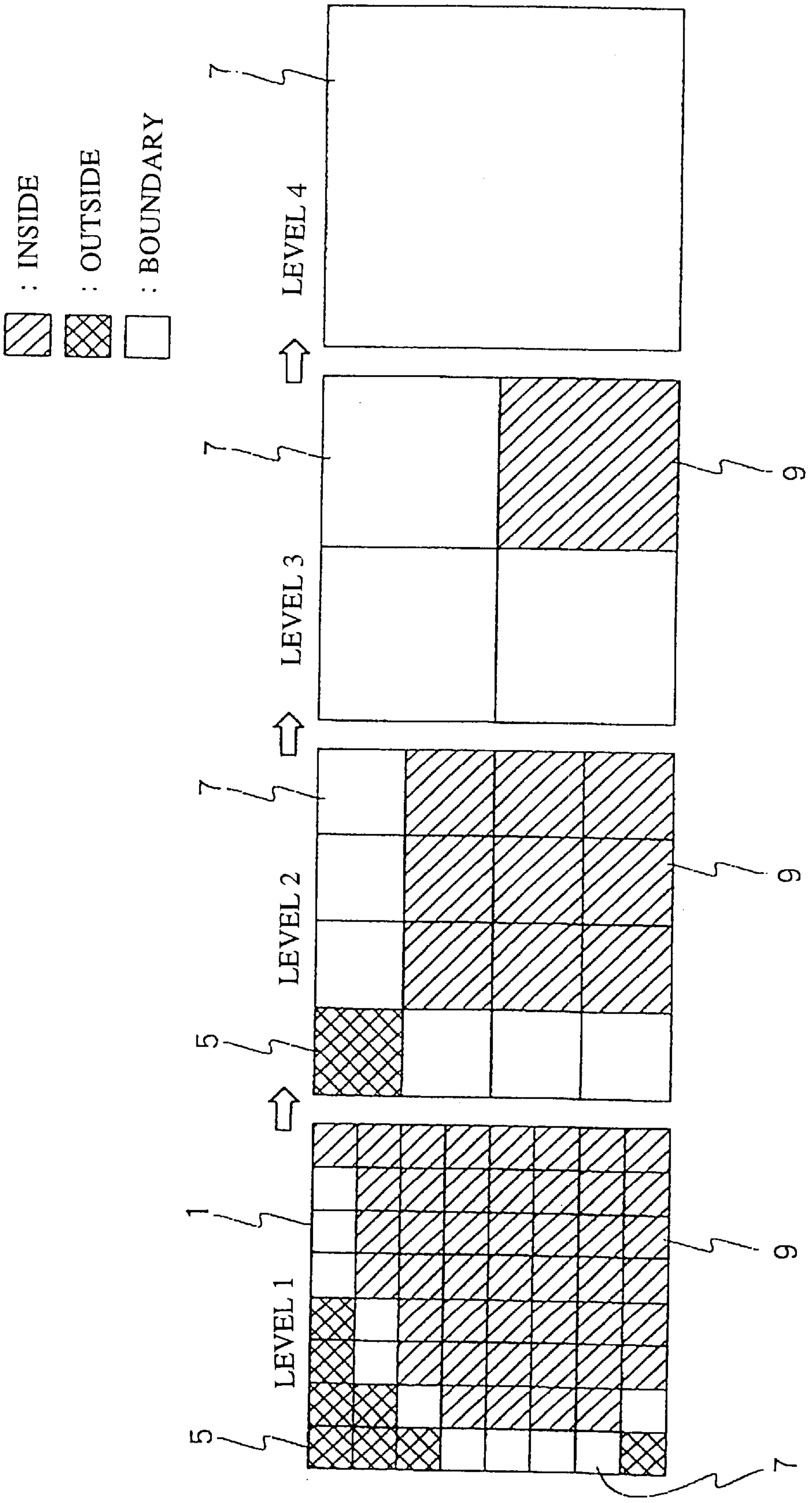
FIG. 3 is two-dimensional and explains an example for the formulation of octree data from voxel data.

FIG. 3 is a two-dimensional view showing the transition of gradually reaching another level to obtain data. As seen in FIG. 3, the size of the voxel rectangle is adjusted to be equal to that of the finest rectangle. A voxel represented by the number 7 is located at the boundary. A voxel represented by the number 5 is located outside of the shape [boundary]. A voxel represented by the number 9 is located inside of the shape. The number of voxel rectangles is not specifically restricted. The number of the rectangles of the octree per edge is $2^n$ such as 1, 2, 4, 8, 16, . . . Therefore, the number of rectangles of the octree is determined to be $2^n$ less than the voxel number of rectangles. One may consider that the octree is positioned to float in the voxel, to absorb the difference in the number of rectangles between the voxel and octree. The following explanation assumes on no difference in the number of rectangles between the voxel and octree, to simplify the explanation.

The voxel data include information on the location of each rectangle inside or outside of the shape [boundary] or at the boundary. The fineness of the original voxel is referred to as level 1 as seen in FIG. 3. In the case of a voxel with each edge having a number of rectangles that is ½ (twice as much as the width of the rectangle), the fineness is referred to as level 2. One rectangle in level 2 corresponds to 8 rectangles in level 1. This is referred to as the relationship between a parent and child. If all of 8 child rectangles in level 1 corresponding to one parent rectangle in level 2 are located inside of the shape [boundary], the parent rectangle in level 2 will be located inside of the shape. If all of 8 child rectangles in level 1 corresponding to one parent rectangle in level 2 are located outside of the shape, the parent rectangle in level 2 will be located outside of the shape. If 8 child rectangles in level 1 include a mixture of the rectangles inside and outside of the shape and at the boundary, the parent rectangle in level 2 is located at the boundary. Data of level 2 (parent) are obtained from data of level 1 (child). Data of level 3 (voxel of level 3 with each edge having a number of rectangles that is ½ of that obtained for level 2) are obtained from data of level 2. The hierarchical voxel data can be obtained, based on the relationship between parent and child, by gradually increasing the level.

Hierarchical voxel data can be converted to octree data by starting from the top level of the hierarchical voxel data. However, since the formulation of octree data is not the purpose, the hierarchical voxel data may be used as octree data, which is advantageous because it is easy to convert the hierarchical voxel data to hexahedral elements, and because the level of output elements can be easily restricted (easy operation such as appointing the location to limit the maximum output level). Therefore, hierarchical voxel data are used as octree data in the present invention.

In the case of obtaining a difference in size between neighboring elements, the larger one may be used as a hexahedral element with 20 nodes to maintain the connection between the elements of an analytical model. In order to easily constrain the nodes floating between neighboring elements while maintaining analytical accuracy, the difference in size between neighboring elements in 1 level or less may be obtained when octree data are formulated. Analytical accuracy can be maintained and the amount of data can be reduced by formulating an analytical model in the above-mentioned process. Therefore, a complicated shape or a large shape can be analyzed.

Figure 4:
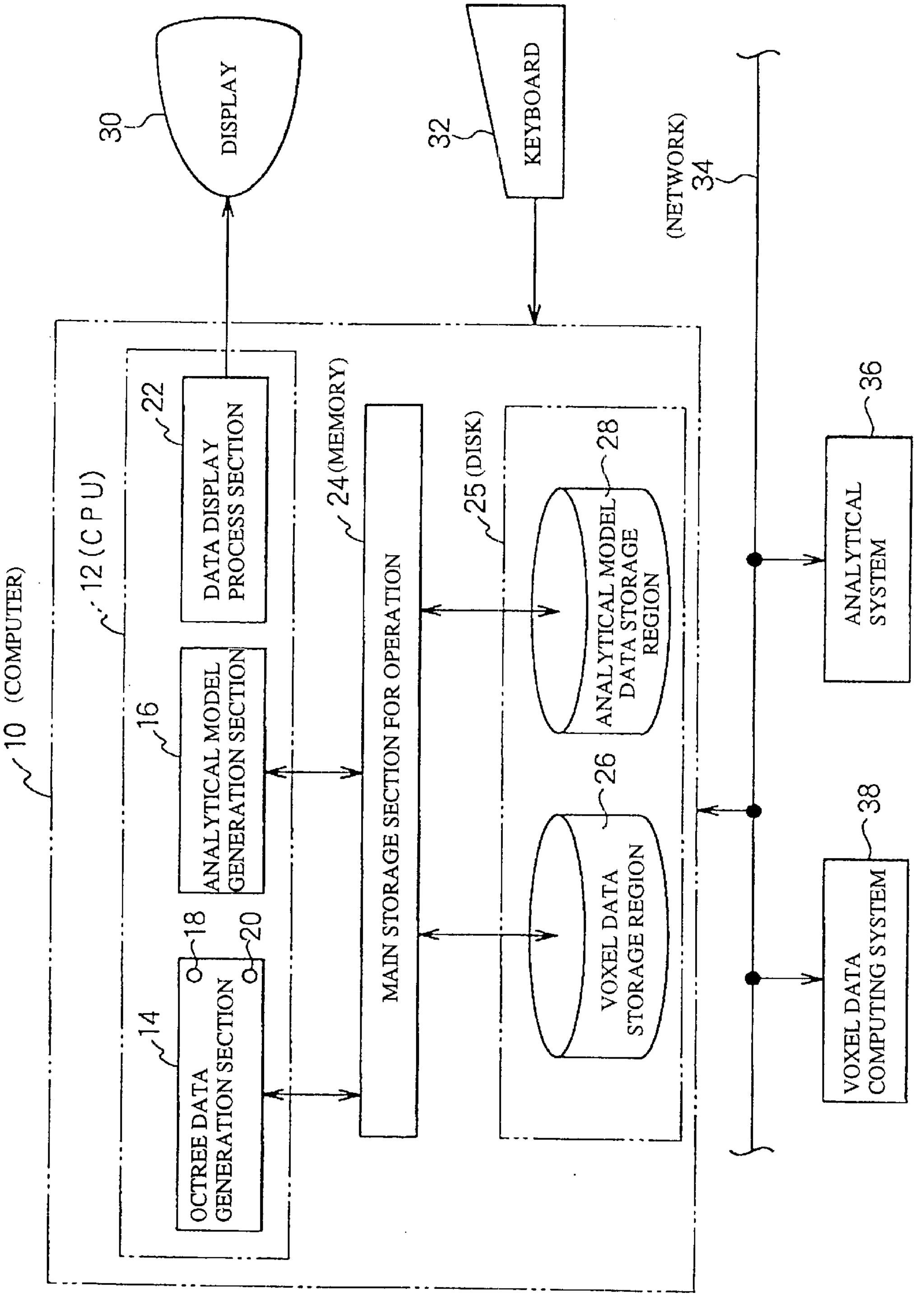
FIG. 4 is a block showing the embodiment of the present invention.

FIG. 4 shows the structure of a computer 10 for the analytical model formulation of the present invention. As seen in FIG. 4, the computer 10 for analytical model formulation of the present invention contains CPU 12, memory 24 used as a main storage for the operation of CPU 12, voxel data, and disk 25 used to store the analytical model. The computer 10 for analytical model formulation may contain display 30 used to display voxel data, analytical model data, and analytical results, as well as keyboard 32 used to input a variety of commands for CPU 12.

The computer 10 for analytical model formulation is connected to both voxel data computing system 38 and analytical system 36 through network 34. Voxel data computing system 38 divides CAD data into voxels having the minimum size because of the relationship with analytical accuracy to formulate voxel data. Analytical system 36 performs structural analysis using a finite element method, based on the analytical model data of the present invention.

CPU 12 reads voxel data, which defines the shape of an object of analysis using the groups of rectangles, to become a voxel data reading means. CPU 12 temporarily stores voxel data computed by voxel data computing system 38 in voxel data storage area 26, and gradually reads voxel data during octree data formulation. CPU 12 also contains octree data formulation part 14 where octree data are formulated from voxel data, along with analytical model data generation section (voxel redefinition means) 16 used to apply a specific node constraining treatment for octree data to formulate analytical model data.

Octree data formulation part 14 contains boundary determination means 18 used to determine whether each voxel of voxel data is located at the boundary separating the inside from the outside of the shape of an object of analysis; it also contains connected voxel determination means 20 used to recursively determine whether the voxel at each level is connected to the other voxel that is determined to be located at the boundary by boundary determination means 18. Analytical model data generation section (voxel redefinition means) 16 is used to redefine each voxel at each level in the groups determined, by the connected voxel determination means, to be voxels several times wider than rectangular voxels determined to be located at the boundary by the boundary voxel determination means.

If voxels at the levels determined by the connected voxel determination means have different sizes, analytical model data generation section (voxel redefinition means) 16 involves the middle-node definition function used to obtain middle nodes, which connect to the smaller voxel, at both the edges and surface of the larger voxel, and involves the constrain definition function used to constrain the nodes defined by the middle-node definition function at the nodes around the middle nodes.

The process operated by CPU 12 is shown in FIG. 1. Both octree data formulation part 14 and analytical model data generation section (voxel redefinition means) 16, shown in FIG. 4, are operated by analytical model formulation program CPU 12. Therefore, CPU 12 functions as octree data formulation part 14 while running the analytical model formulation program.

The analytical model data generation section (voxel redefinition means) 16 contains the voxel data reading command used to drive the above-mentioned computer and to read voxel data on the shape of an object of analysis, which is defined by the groups of rectangles of voxels; the boundary determination command used to determine whether each voxel of the voxel data, read by the voxel data reading command, is located at the boundary separating the inside from the outside of the shape of the above-mentioned object of analysis; the connected voxel determination command used to recursively determine whether the voxel a each level is connected to the other voxel that is determined to be located at the boundary by the boundary determination command; and the voxel redefinition command used to redefine each voxel at each level in the group determined by the above-mentioned connected voxel determination command to obtain a voxel at each level that is several times wider than the rectangular voxel determined to be located at the boundary by the above-mentioned boundary determination command, also, the analytical model data generation section (voxel redefinition means) 16 contains the above-mentioned voxel redefinition command, which contains both the middle-node definition command used to obtain middle nodes used to connect small voxels to large voxels at the edges or on the surfaces of the large voxels at the voxels whose sizes are varied and of which levels are determined by the above-mentioned connected voxel determination command, as well as the constrain definition command used to constrain the nodes, defined by the middle-node definition function, using the nodes around the middle nodes.

"Operation command" means a command for a computer operation (computer) either via a single command alone, a command for a computer operation by other programs such as an operating system that is previously stored in the computer, or both commands. In the example shown in FIG. 4, a voxel data reading command is used to order a computer to read voxel data stored in a specific region or under a specific name using the file input and output function of the operating system. Therefore, the voxel data reading command gives the name of a file, which is a reading object, to an operating system. A command for giving the name of a file, which is a reading object, to an operating system alone may be stored in a medium used to store the program for analytical model formulation and to send the program to users. It depends on the relationship with an operating system of the computer to be operated.

A program file for analytical model data generation section (voxel redefinition means) 16 is stored in a storage medium that is able to send programs, and is introduced into the computer. Any nonvolatile storage medium, which can fix data, such as a CD-ROM or a floppy disk, is suitable. The program can be introduced into an auxiliary storage unit through a communication line from other host units.

When the analytical model formulation program is executed by CPU 12 shown in FIG. 4, an analytical model data generation section (voxel redefinition means) 16 shown in FIG. 4 is obtained, and an analytical model formulation method shown in FIG. 1 is used. Analytical model data are obtained by the analytical model (manufacturing) formulation method.

The analytical model data involve a first-level voxel that is located at the boundary between the inside and the outside of the shape of the above-mentioned object of analysis, a second-level voxel that is connected to the first-level voxel and that is wider than the first-level voxel, and an n-level voxel that is connected to the m-level voxel and is wider than the m-level voxel. The n-level voxel contains constraint data used to define a middle node that is brought in contact with the vertex of the m-level voxel to constrain the middle node and the vertex of the m-level voxel. The analytical model data are stored in analytical model data storage region 28 and read by analytical system 36 in the example shown in FIG. 4. Because the analytical model data have an octree structure, fewer elements are required; the m-level is connected to the n-level by both middle nodes and constraint data in the octree structure, so a high analytical accuracy can be maintained.

Octree Data Formulation

In the following, the application example of octree formulation from voxel data is explained with FIGS. 5 through 15. The application example involves a voxel data reading process used to read voxel data of the shape on an object of analysis that is defined by the groups of rectangles of the voxel; a boundary determination process used to determine whether each voxel contained in the voxel data, which is read in the voxel data reading process, is located in a boundary separating the inside from the outside of the shape of the above-mentioned object of analysis; a connected voxel determination process used to recursively determine whether the voxel at each level is connected to the other voxel that is determined to be located in the boundary at the boundary determination process.

The connected voxel determination process involves a first-level setting process used to set all of the voxels of voxel data, which is read in the above-mentioned reading process, in the first level; a second-level setting process used to extract the groups of voxels, which are contained in the rectangles that are two times wider than the first-level voxels, from the voxels in the first level, and to set the remaining voxels, obtained by removing the groups of voxels whose surfaces are connected to the above-mentioned boundary from the groups of voxels extracted, in the second level; a third-level setting process used to extract the groups of voxels that are contained in the rectangles, which are two times wider than the second-level voxels and whose surfaces are not directly connected to the above-mentioned first-level voxels, from the voxels in the second level in the second-level setting process, in the third level; and an n-level setting process used to hierarchically set the groups of voxels that are set in the third-level setting process, in the first level up to the n-level. In the following, details are given.

Figure 5:
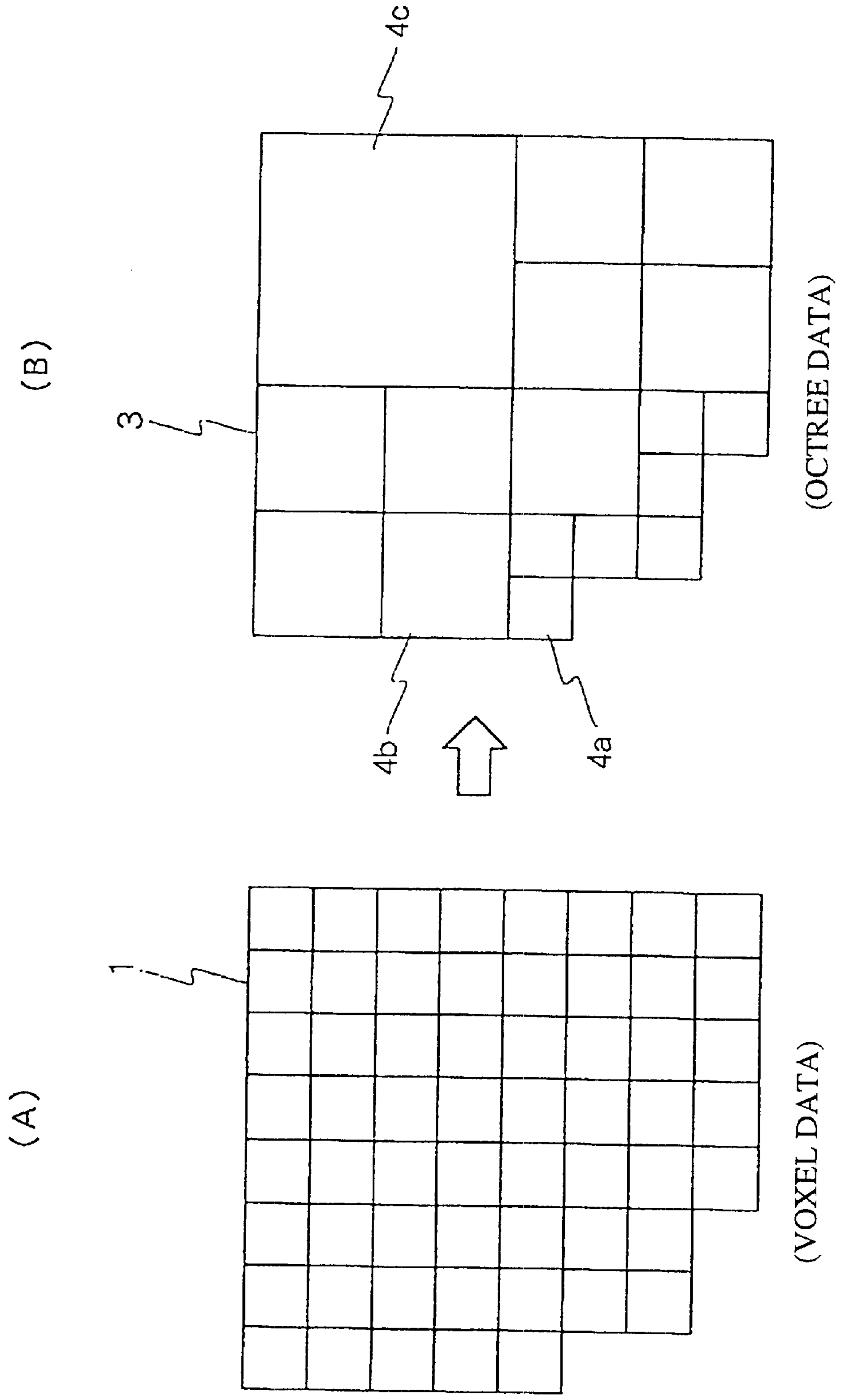
FIG. 5 is two-dimensional and explains voxel data 5A and octree data 5B, both of which are used for the processes shown in FIGS. 1 through 5.

FIG. 5 explains both an original voxel data and the image of the octree made with the original voxel data. FIGS. 6 through 11 explain the examples of data sequentially used in the octree formulation process. FIGS. 6 through 11 show the two-dimensional images.

Figure 6:
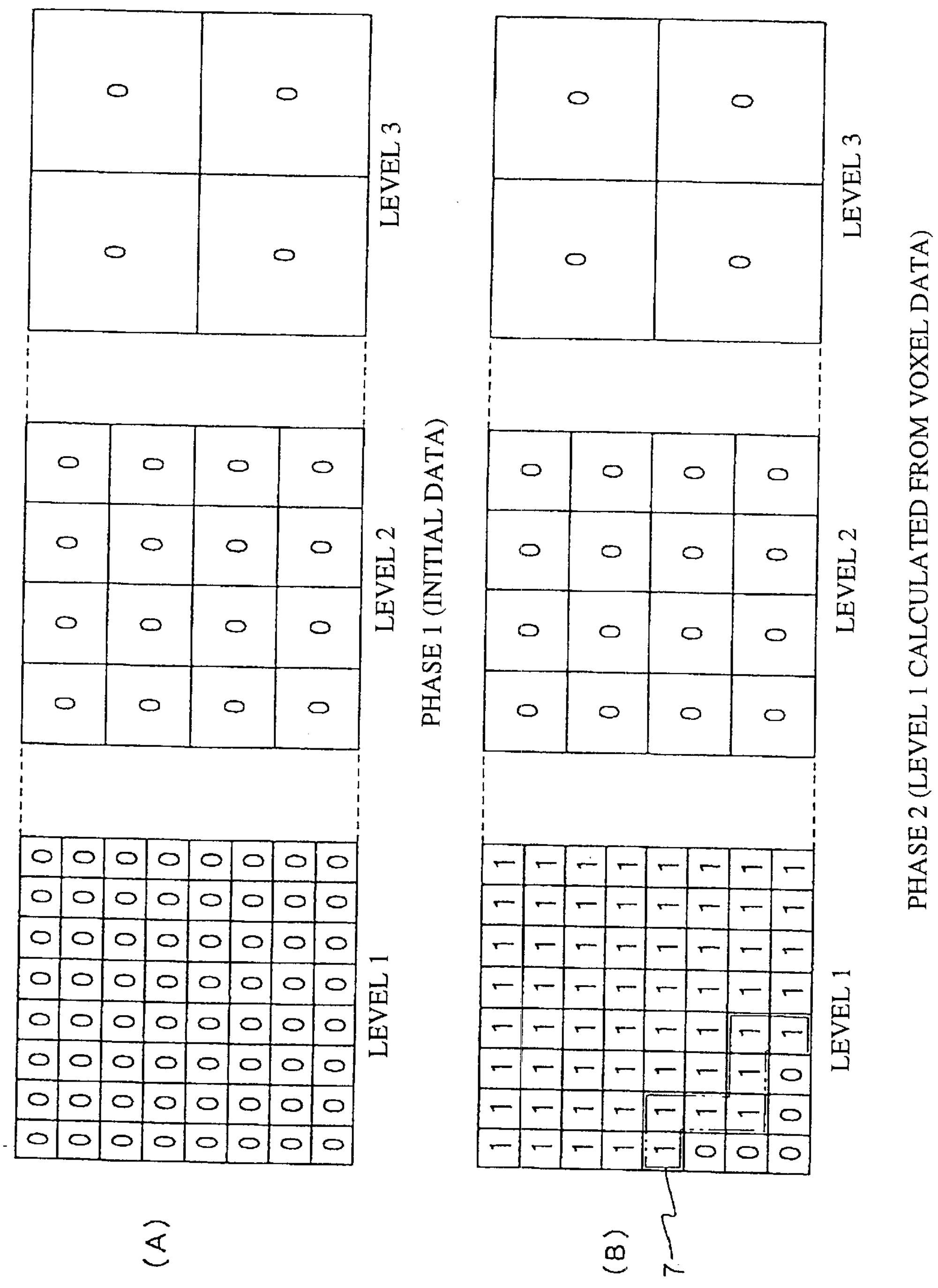
FIG. 6 explains an example of a process for the hierarchical definition of voxel data. Part 6(A) shows an example of initial data (Phase 1) and Part 6(B) shows an example of Phase (2) for level 1 obtained from voxel data by computing
Figure 7:
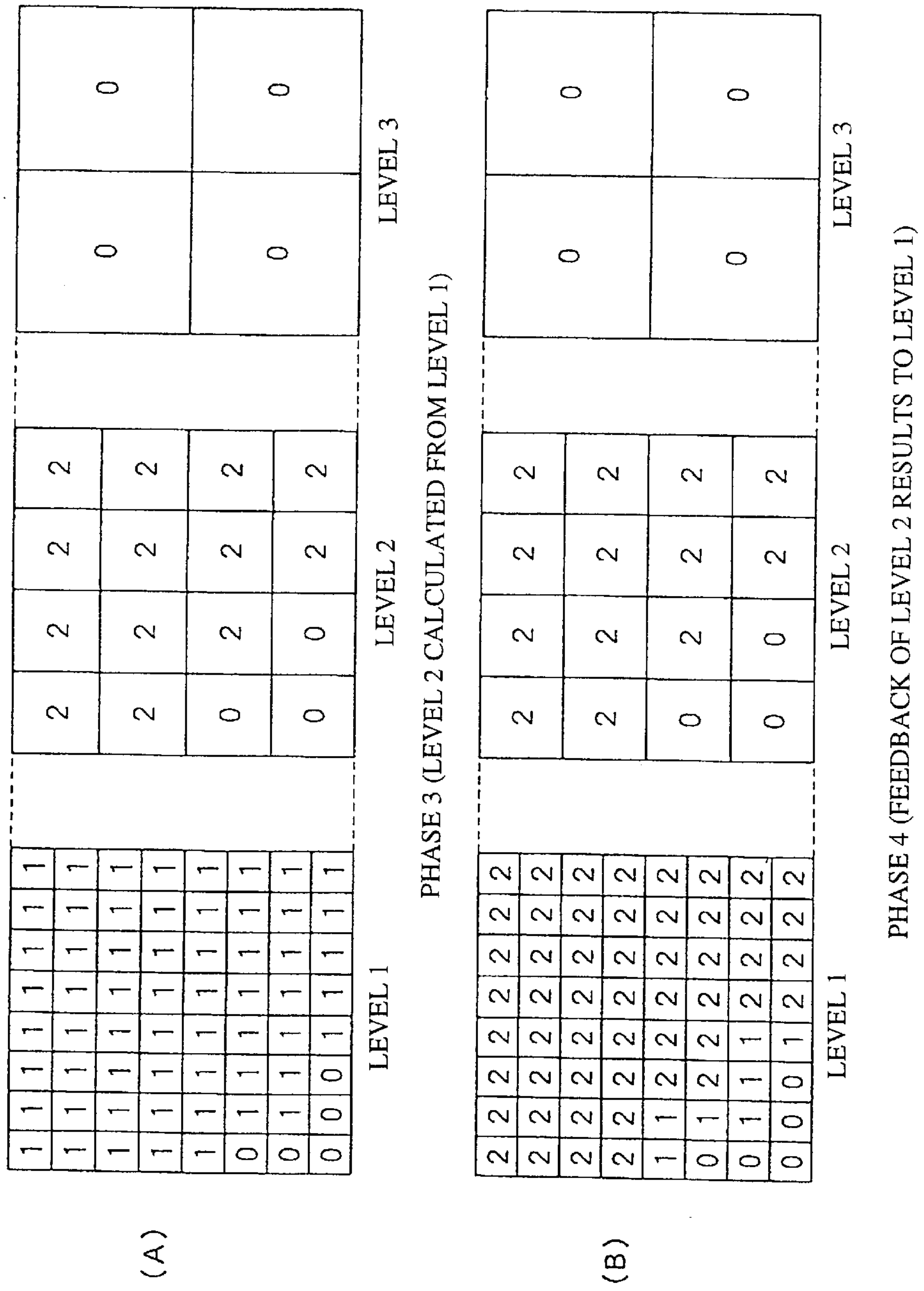
FIG. 7 shows an example of the phase following FIG. 6. Part 7(A) shows an example of Phase 3 for level 2 obtained from level 1 by computing. Part 7(B) shows an example for feeding back the result of level 2 to level 1.
Figure 8:
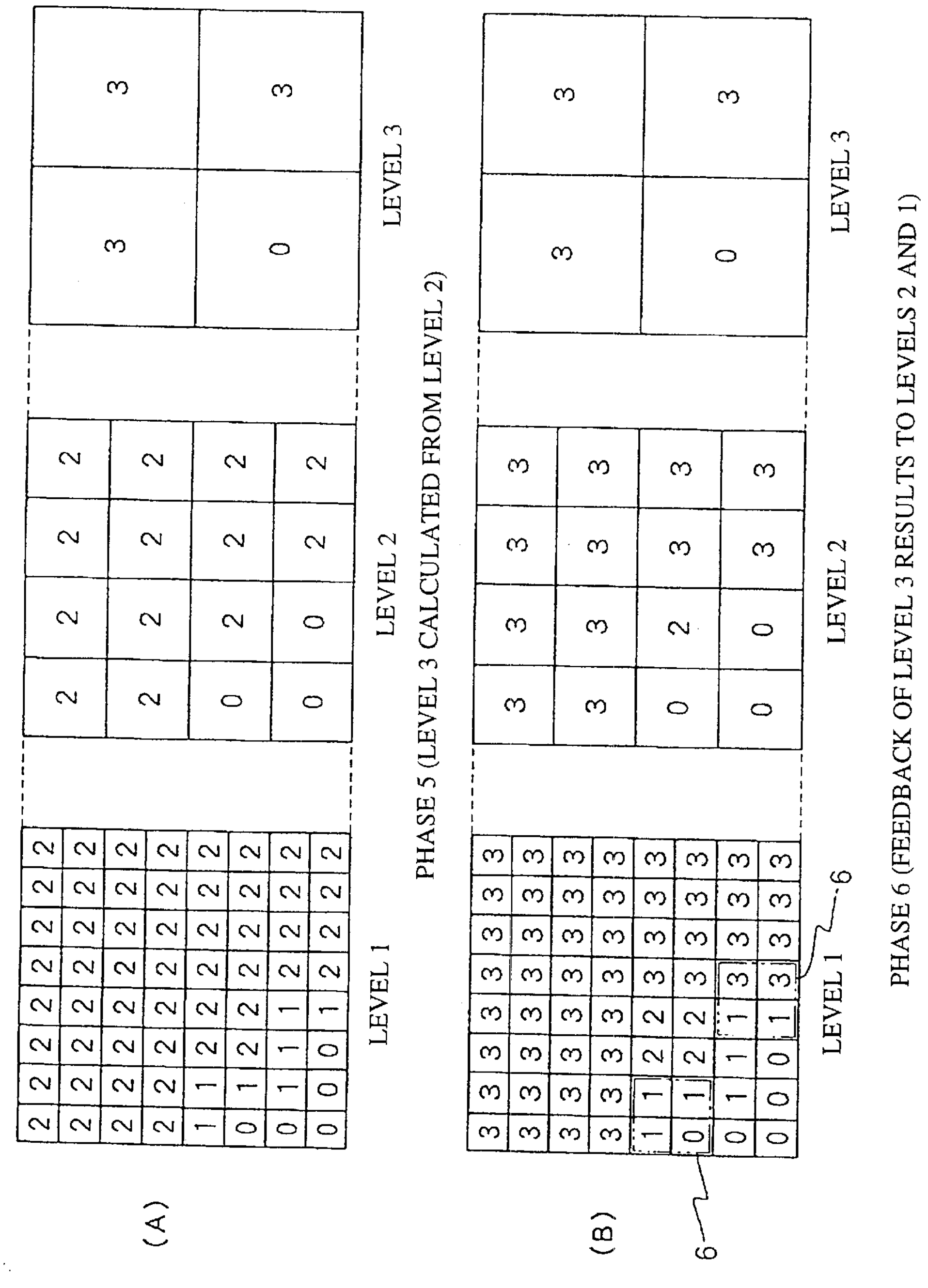
FIG. 8 shows an example of the phase following FIG. 7. Part 8(A) shows an example of Phase 5 for level 3 obtained from level 2 by computing. Part 8(B) shows an example of feeding back the result of level 3 to levels 1 and 2.

Voxel data are referred to as octree level-1 data. As seen in FIG. 6 (Phase 1), each data rectangle of the octree is initialized outside of the shape (numerical value: 0). Data 1 is set for the rectangles located inside the shape. Any value indicating the boundary (not used to indicate any rectangle located either outside of the shape or at the boundary) is set for the rectangles located at the boundary. In the example shown in FIG. 6 (Phase 2), only data 1 is set for rectangles located inside of the shape because no boundary may exist.

Parent data are obtained by computing while gradually increasing the level from level 1 data. Level-2 data are obtained by computing level-1 data. As seen in FIG. 7(A) (Phase 3), level-2 rectangles are used to search the rectangles located inside of the shape (all of the corresponding child rectangles of level 1 located inside of the shape), and data 2 is set for the rectangles located inside of the shape. The level value is used to indicate the data value set at each level (in the case of level 2, 2; in the case of level 3, 3).

Figure 9:
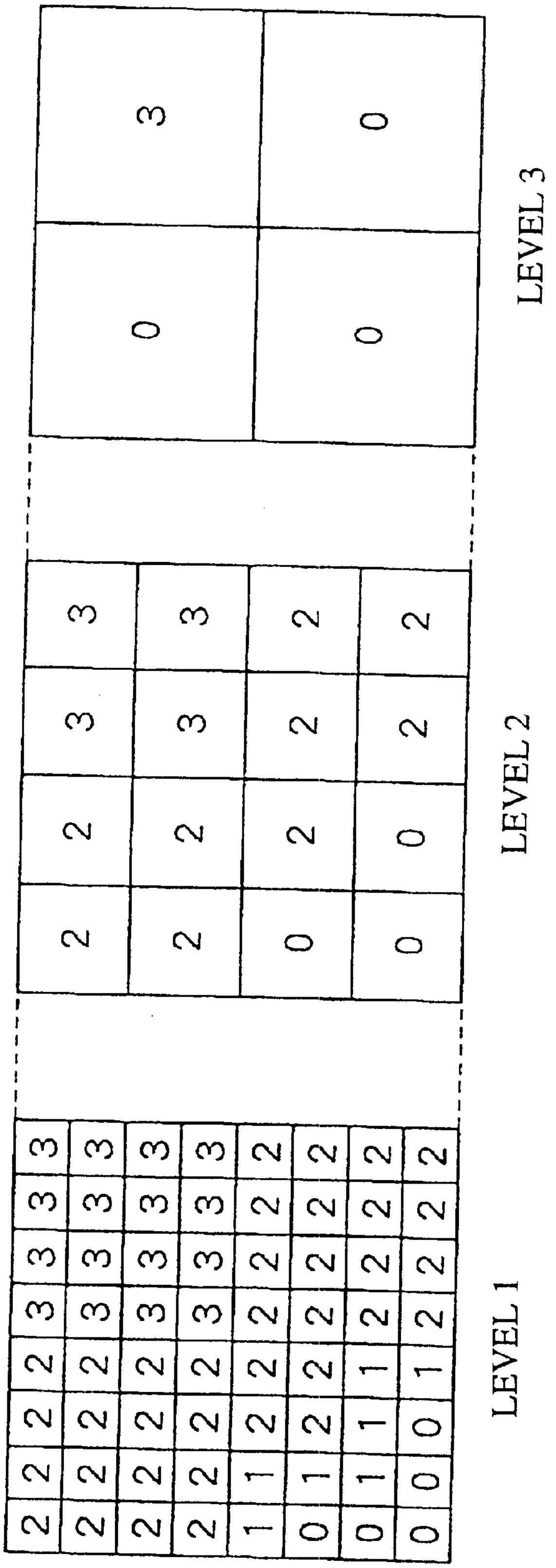
FIG. 9 follows FIG. 8, and explains an example of modification of the region where the level is 2 or higher.

As seen in FIG. 7(B) (Phase 4), data 2 is set for the rectangles of level 1, corresponding to that of level 2 located inside of the shape (feeding back the following determination result obtained in the upper level, i.e., the rectangles located inside of the shape, to the data in the lower level) As seen in FIG. 8(A), level-3 data are obtained by computing level-2 data. As seen in Phase 5, it can be determined that 3 rectangles in level 3 are located inside of the shape (all of the corresponding child rectangles in level 2 located inside of the shape). FIG. 8(B) (Phase 6) shows the feeding back of the following determination result obtained in level 3, i.e., the rectangles located inside of the shape, to both levels 1 and 2As seen in Phase 6 (level 1, symbol 6), a level-1 rectangle is brought in contact with a level-3 rectangle, and no connection would result between the elements even if both hexahedral elements with 20 nodes and MPC were used. Thus, a modification must be made to prevent the connection between one rectangle and another rectangle at a level that is 2 or more levels apart, as seen in FIG. 9 (Phase 7). Before setting data, shown in Phases 5 and 6, in the case of setting the rectangle inside of the shape, it is checked that there is no connection between one rectangle and any other rectangle at a level that is 2 or more levels apart. If the rectangles that are verified as not connecting are set in the following data range, i.e., located inside of the shape, the process between Phase 4 and Phase 7 can be skipped.

Level 1 data are used for checking to see if there is any region wherein a rectangle is brought in contact with any other rectangle at a level that is 2 or more levels apart when the rectangles are set in the following data range, i.e., located inside of the shape in the upper level. Because of the three-dimensional process, all of the neighboring rectangles of a rectangle in the data range, which are brought in contact with the 6 surfaces or with the 12 edges of the rectangle are checked to see if there is any rectangle at a level that is 2 or more places higher or lower.

Figure 10:
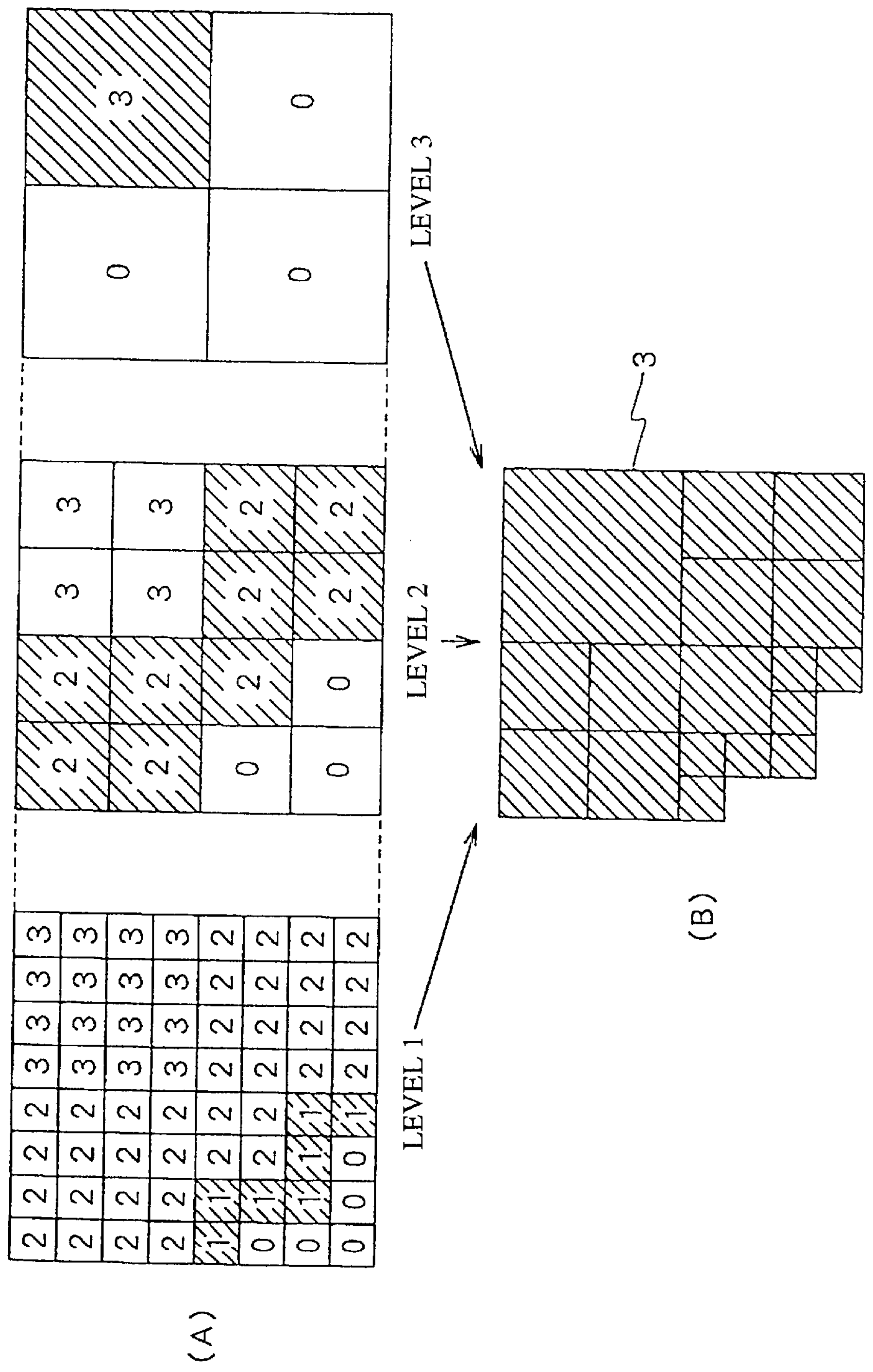
FIG. 10 explains an example of octree data formulation from voxel data, of which the hierarchy is recursively defined in the process shown in FIGS. 6 through 9. Part 10(A) shows voxel data at each level; Part 10(B) explains an example of octree data obtained by the synthesis of voxel at each level.

Octree data are finally output to a file as an analytical model (node, element, MPC). The values displaying 1 and the boundary are previously set in data for the rectangle that is output by level 1. In the case of a level higher than level 2, the rectangles set in each level (value) are output at each level. The hatched rectangles in FIG. 10 are to be output at each level.

Figure 11:
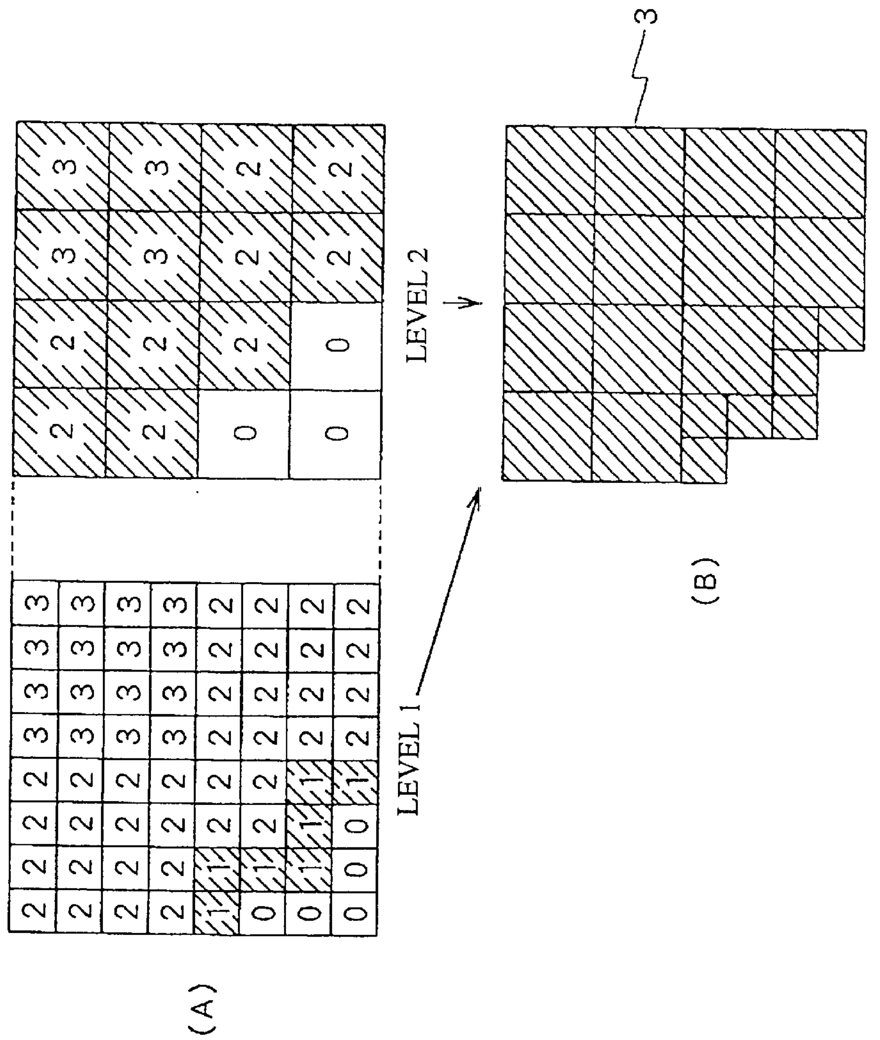
FIG. 11 explains an example of octree data formulation under level restriction. Part 11(A) shows voxel data at each level; Part 11(B) shows an example of octree data formulation obtained by the synthesis of voxel data at each level.

Any level can be obtained as a maximum level for a rectangle output from the octree data (in order to adjust the level of an element, so that no excessively large element can be obtained). In the case of outputting the rectangles in maximum level 2, any rectangle in which the data of a level that is higher than the maximum is installed may be output. FIG. 11 shows an image obtained when the rectangles at the maximum level 2 are output. In the case of a rectangle set in level 2 but receiving the data of level 3, it is output as a rectangle set in level 2 since the maximum level is 2. The maximum output may be applied entirely or partially (around the area where boundary conditions are input). In the present invention, voxel data are treated like octree data to easily define the maximum output or the middle node.

Figure 12:
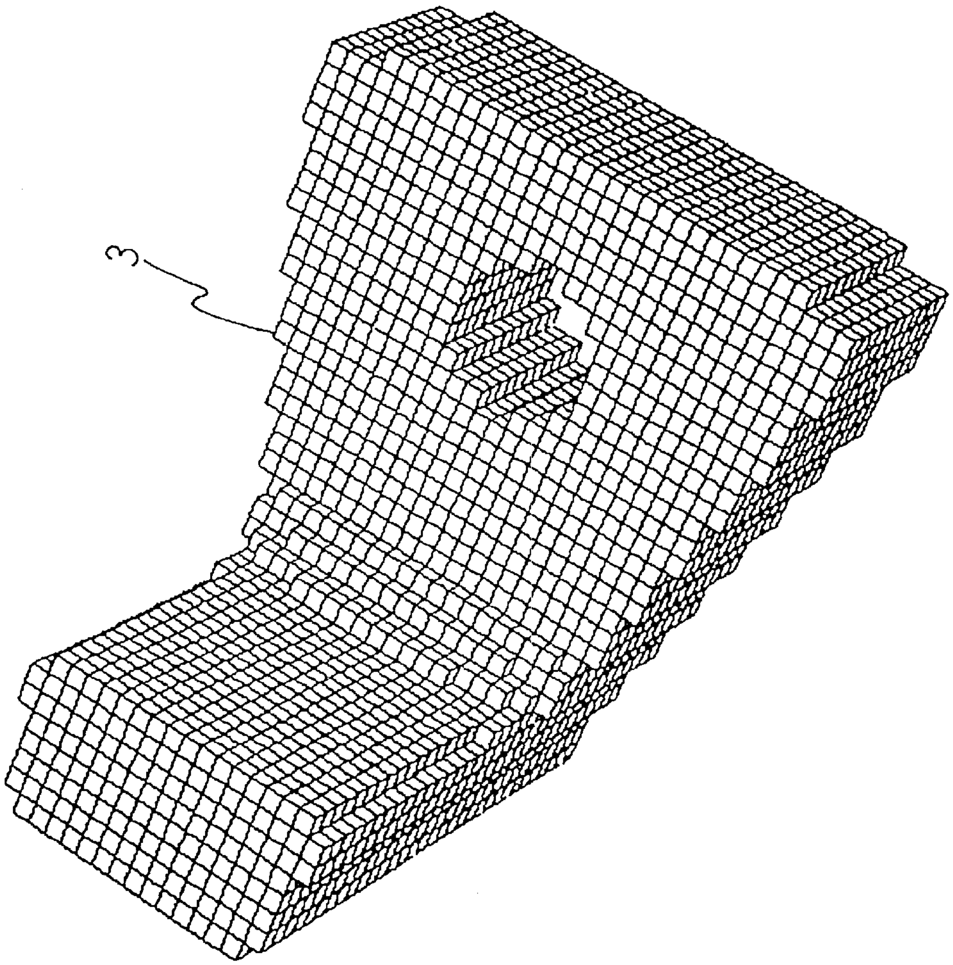
FIG. 12 is an angled view showing an example of octree data obtained in the present invention.
Figure 13:
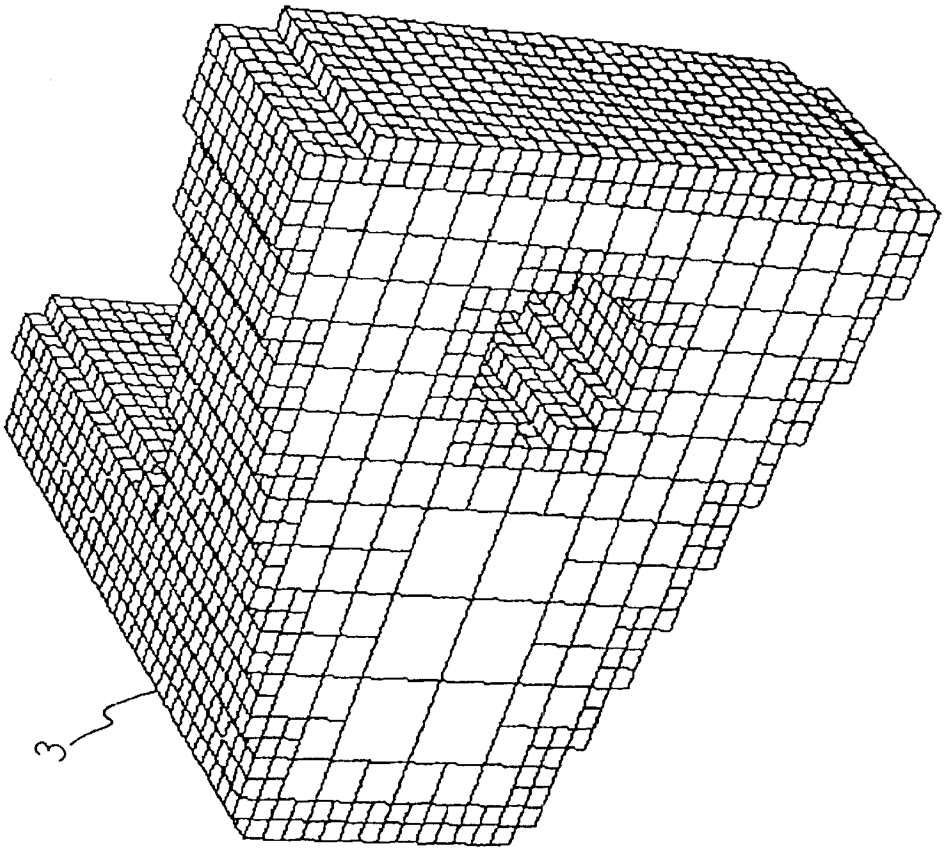
FIG. 13 is a cross-sectional view showing octree data shown in FIG. 12.

FIG. 12 shows an example of octree data obtained from voxel data of a three-dimensional model. Since the model is not flat, fine rectangles are present on the surface, and the rectangles (elements) are consolidated from the outside toward the inside. Therefore, it looks like voxel data from outside. FIG. 12 is a cross-sectional view showing octree data; FIG. 13 is a view of octree data from the bottom. As seen in FIG. 13, in the case of a three-dimensional model, the rectangles (elements) gradually become larger from outside toward inside.

Figure 14:
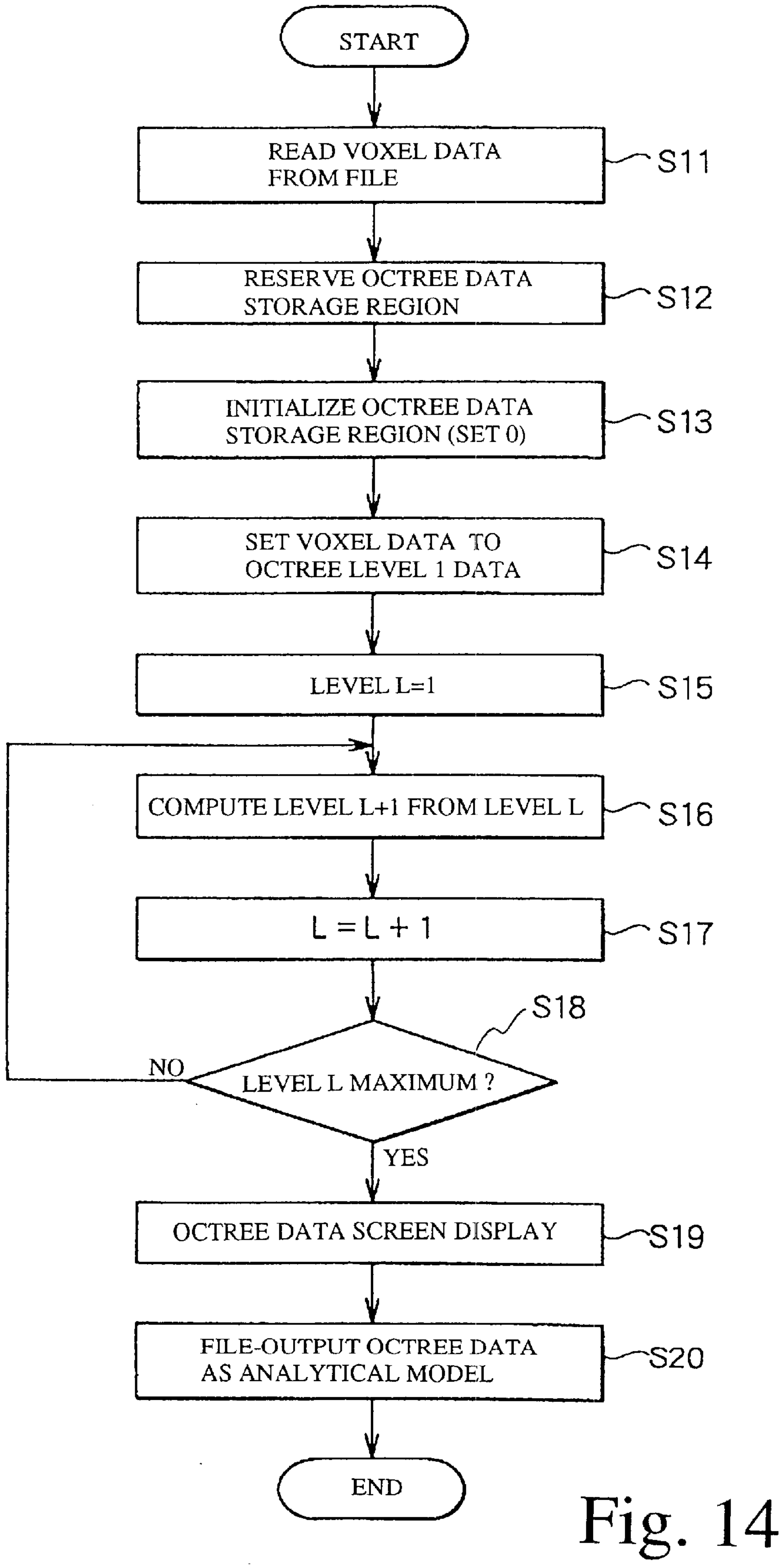
FIG. 14 is a flow chart showing an example of the analytical model formulation process of the present invention.

FIG. 14 shows an example of the octree data formulation process. Voxel data are read from a file (step S11). An octree data storage region is then reserved (step S12). The data storage region is then initialized, in which the voxel data are obtained as octree level-1 data (step S13). Next, the voxel data is converted to level 1 octree data (step S14). A level counter, L., is then initially set to 1 (step S15). Next, the L+1 level is computed from the L level octree data (step S16). Next, the level counter L is incremented by 1 (step S17). After the level counter is incremented, a determination is made whether the level counter has reached a threshold value (step S18). If the counter has no reached a threshold value, the "NO" branch is followed to step S16, in which the L+1 level is computed. The process continues until the level counter has reached the threshold value, in which the "YES" branch is followed to step S19, in which octree data are displayed to a computer screen (step S19). Finally, the octree data are output to a file as an analytical model (step S20). Hexahedral rectangles with 20 nodes may be brought in contact with the rectangles 1 level lower, and MPC may be applied. Finally, step S20 is followed by the "END" step.

Figure 15:
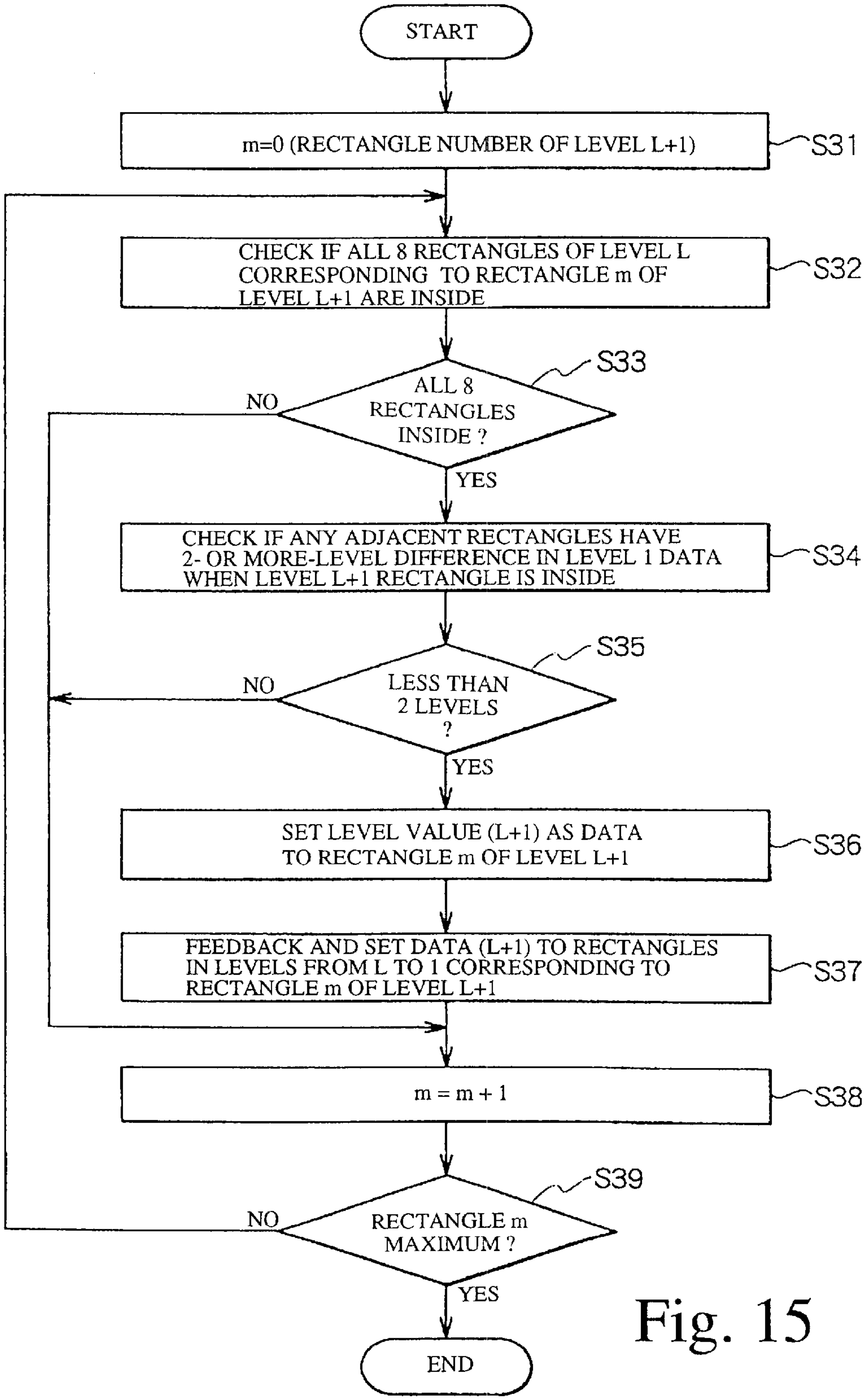
FIG. 15 is a flow chart showing an example of the detailed process (step S16) shown in FIG. 14.

FIG. 15 shows the details of computing to obtain level L+1 from level L; "m" represents a level L+1 rectangle; "m"=0 (step S31). Whether all of the 8 level L rectangles corresponding to level L+1 rectangle "m" are located "inside" is checked (step S32). If all of the 8 level L rectangles are located inside (step S33), whether no rectangles at a level that is 2 or more levels apart from the next one is obtained if level L+1 is located inside is checked using level-1 data (step S34). If the level difference is not 2 or more (step S35), level (L+1 ) is installed as data in a level L+1 rectangle "m" (step S36). Data L+1 is fed back and installed in level L through 1 rectangles corresponding to level L+1 rectangle "m" (step 537).

If not all of the 8 rectangles are located inside in step S33 or if the level difference is 2 or more in step S35, or when the following rectangle is defined after step S37, "m" is incremented. The above-mentioned process is repeated until rectangle "m" reaches the highest level (step S39).

Analytical Model Formulation

An application example for node constraint is explained with FIGS. 16 through 20. Octree data (hierarchical voxel data) are used to obtain an analytical model. The analytical model must consist of the elements that are correctly connected to their neighboring elements. Elements are connected to each other by sharing nodes in the case of using the infinite element method. In both cases of using voxel data to obtain octree data and of using octree data to obtain an analytical model, maintaining a connection between the elements must be considered. In the application example, a connection between the elements is maintained by combining the following three ideas.

(1) In the case of an element at a level that is apart from that of its neighboring element, the larger element is used as a hexahedral element with 20 nodes.

(2) In the case of a node floating between neighboring elements, MPC is applied.

(3) When octree data are obtained, each element must be connected to its neighboring element at a level that is not more than 1 level apart from the next one.

When the rectangles in level 2 or higher are output, they are checked to determine whether any rectangle at a level that is 1 level apart is brought in contact with the other rectangles. The same data at level 1 used for checking (to see if any rectangle is brought in contact with the other rectangle at a level that is 2 or more levels apart) in the octree data formulation process is used. All of the neighboring rectangles of a rectangle to be output, which are brought in contact with the 6 surfaces or with the 12 edges of the rectangle, are also checked to see if any rectangle at a level that is 1 level apart is included. If any rectangle at a level that is 1 level apart is brought in contact with another rectangle, hexahedral rectangles with 20 nodes must be output. MPC is applied for a node located at the center of the surface to which the rectangle at the level that is 1 level apart is brought in contact.

In the application example shown in FIG. 1, the voxel redefinition process involves the node definition between a parent-and-child process, which follows the above-mentioned hierarchical structure redefinition process, and is used to define parent voxel of hexahedral elements with 20 nodes including midpoint nodes obtained at each edge of the parent voxel. It is also used to define each central node positioned at the center of each surface of the parent voxel, which is connected to a child voxel, and involves the node constraining process used to constrain each central node that is defined in the node definition between parent-and-child process at each vertex on the surface while it is used to constrain each midpoint node at each end at in the edge.

In the following, the above-mentioned three ideas are explained. Hexahedral elements with 8 nodes (each node of the hexahedral elements is obtained at each of 8 vertices) are used. However, if each rectangle of an octree, which is brought in contact with other rectangles at the various levels, is used as a hexahedral element with 8 nodes to obtain an analytical model, no connection between the elements can be maintained as seen in FIG. 16.

Figure 16:
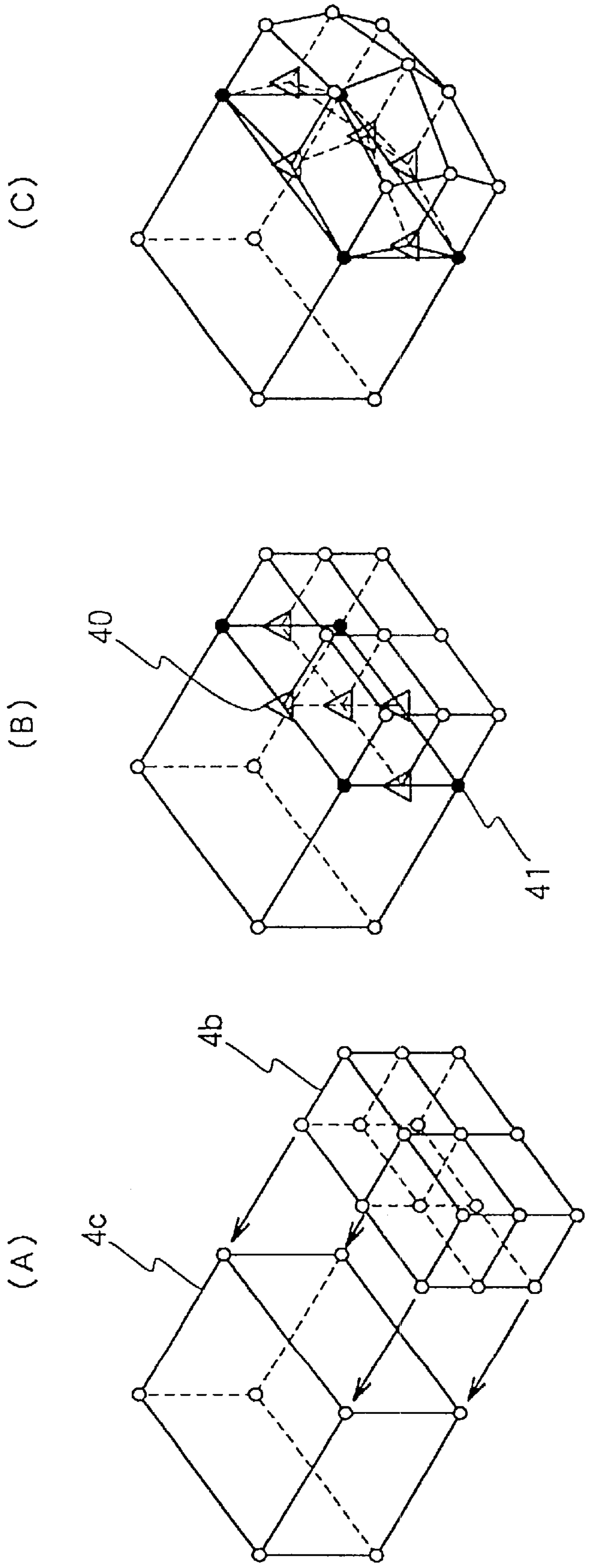
FIG. 16 explains an example of the connection of large voxels to small voxels without adding any middle nodes to the large voxels. Part 16 A) shows an example of the connection of large voxels to small voxels, Part 16(B) shows both the nodes connected and not connected, and Part 16(C) shows an example of exfoliation that occurred by applying tensile stress.

As seen in FIG. 16, large rectangles are connected to small rectangles as the elements at 4 vertices (nodes) of the large rectangles. However, part of the vertices of the small rectangles are not connected, but placed at the edges of the small rectangles (the small rectangles are connected to each other). Therefore, if analysis is performed under the above-mentioned condition, the small rectangles will be exfoliated from the large rectangles, causing a reduction of the analytical accuracy.

Figure 17:
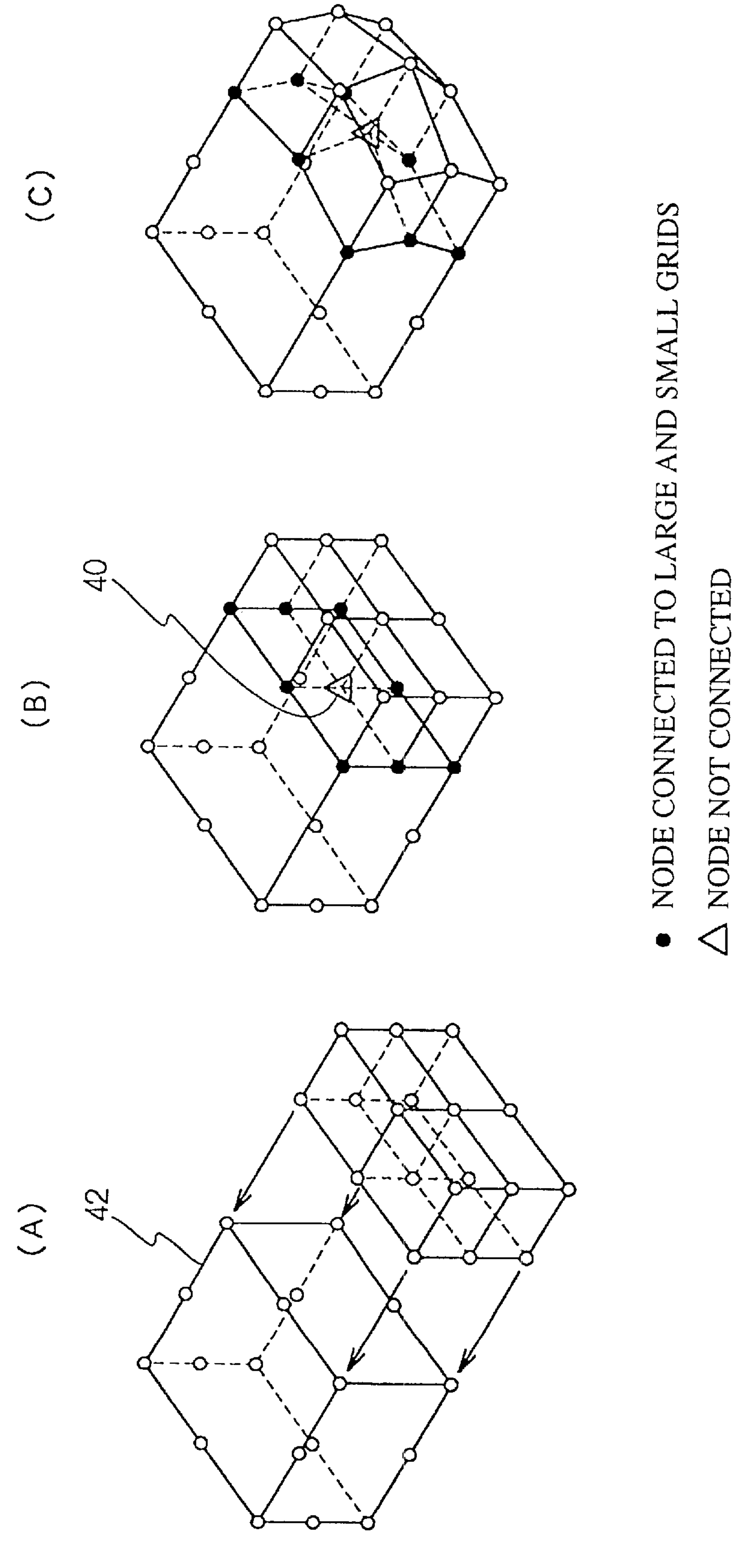
FIG. 17 explains an example of the connection of large voxels to small voxels without adding any middle nodes to the connected surfaces of the large voxels. Part 17(A) shows an example of the connection of large voxels to small voxels, Part 17(B) shows both the nodes connected and not connected, and Part 17(C) shows an example of exfoliation that occurred by applying tensile stress.

In order to avoid problems, both hexahedral elements with 20 nodes and MPC are used in the present invention. A hexahedral element with 20 nodes has all 20 nodes obtained by adding nodes to the midpoints of each edge (12 edges) of a hexahedral element, followed by combining them with 8 vertices. If hexahedral elements with 20 nodes are used for large rectangles and hexahedral elements with 8 nodes are used for small rectangles, the node in the center is not connected. FIG. 17 shows hexahedral elements with 20 nodes used for large rectangles and hexahedral elements with 8 nodes used for small rectangles.

As seen in FIG. 17, even if hexahedral elements with 20 nodes are used, a node that is not connected to any element would be obtained at the center. MPC is applied for the nodes at the center. MPC is an abbreviation for Multi-Point Constraint. MPC defines subordination between a displacement (position) of one node and a displacement (position) of another node. MPC can be applied using Analytical Solver I—DEAS developed by SDRC (U.S.).

Figure 18:
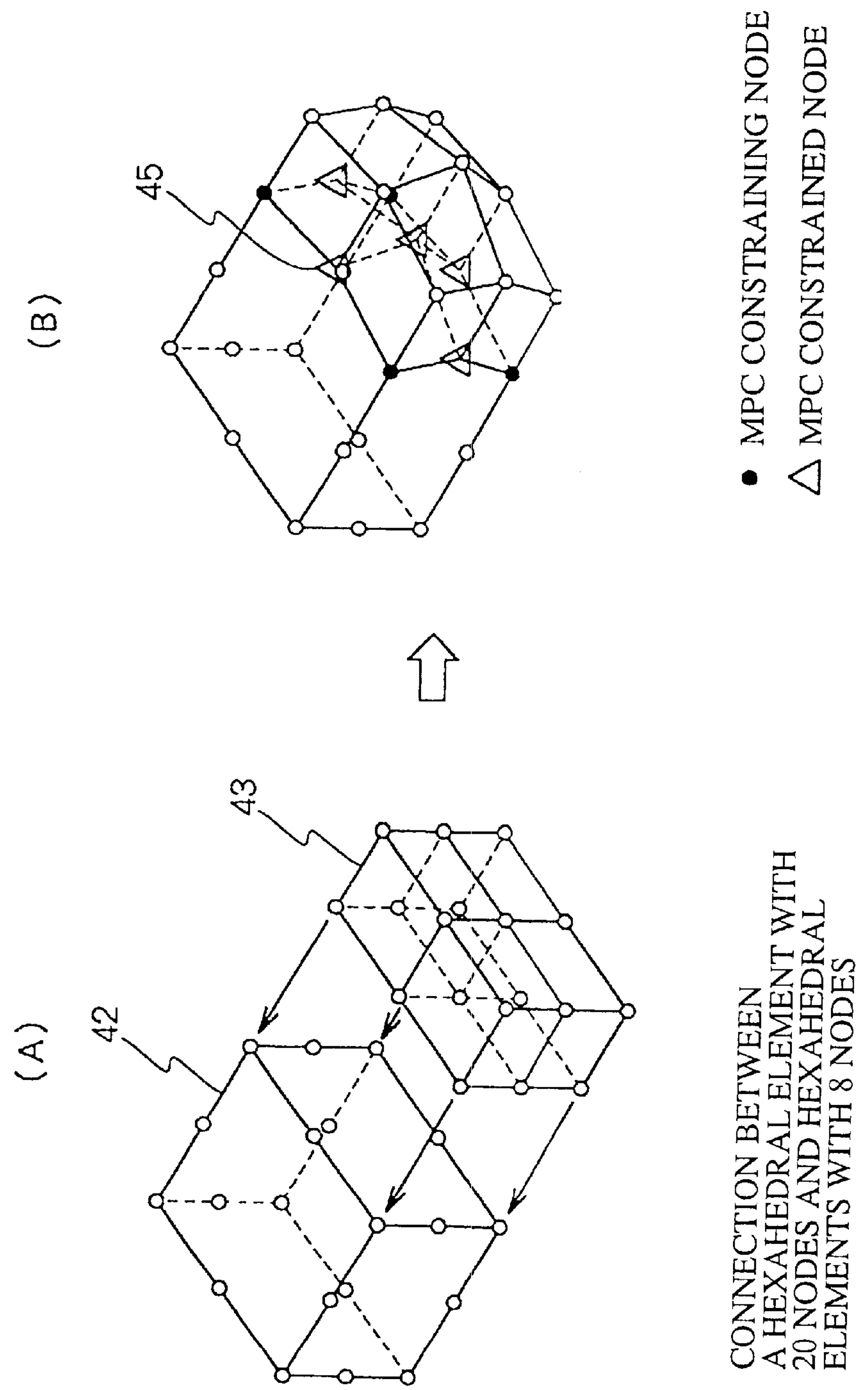
FIG. 18 explains an example of application of MPC for both hexahedral voxels with 20 nodes and hexahedral voxels with 8 nodes. Part 18(A) shows connection examples for each voxel; Part 18(B) shows both the nodes that are used for MPC application and the other nodes for which MPC is applied.

MPC defines subordination between a displacement (position) of one node and a displacement of another node. FIG. 18 shows the case of connecting hexahedral elements with 20 nodes to hexahedral elements with 8 nodes (1 level lower). As seen in FIG. 20(A), MPC is applied for a node at the center using 4 nodes. As seen in FIG. 20(B), MPC is applied for each node at the edges of a hexahedral element with 20 nodes using each endpoint at the edge. The hexahedral elements with 20 nodes are connected to the hexahedral elements with 8 nodes at each node at the edges. However, a better analytical accuracy can be obtained by applying MPC.

Figure 19:
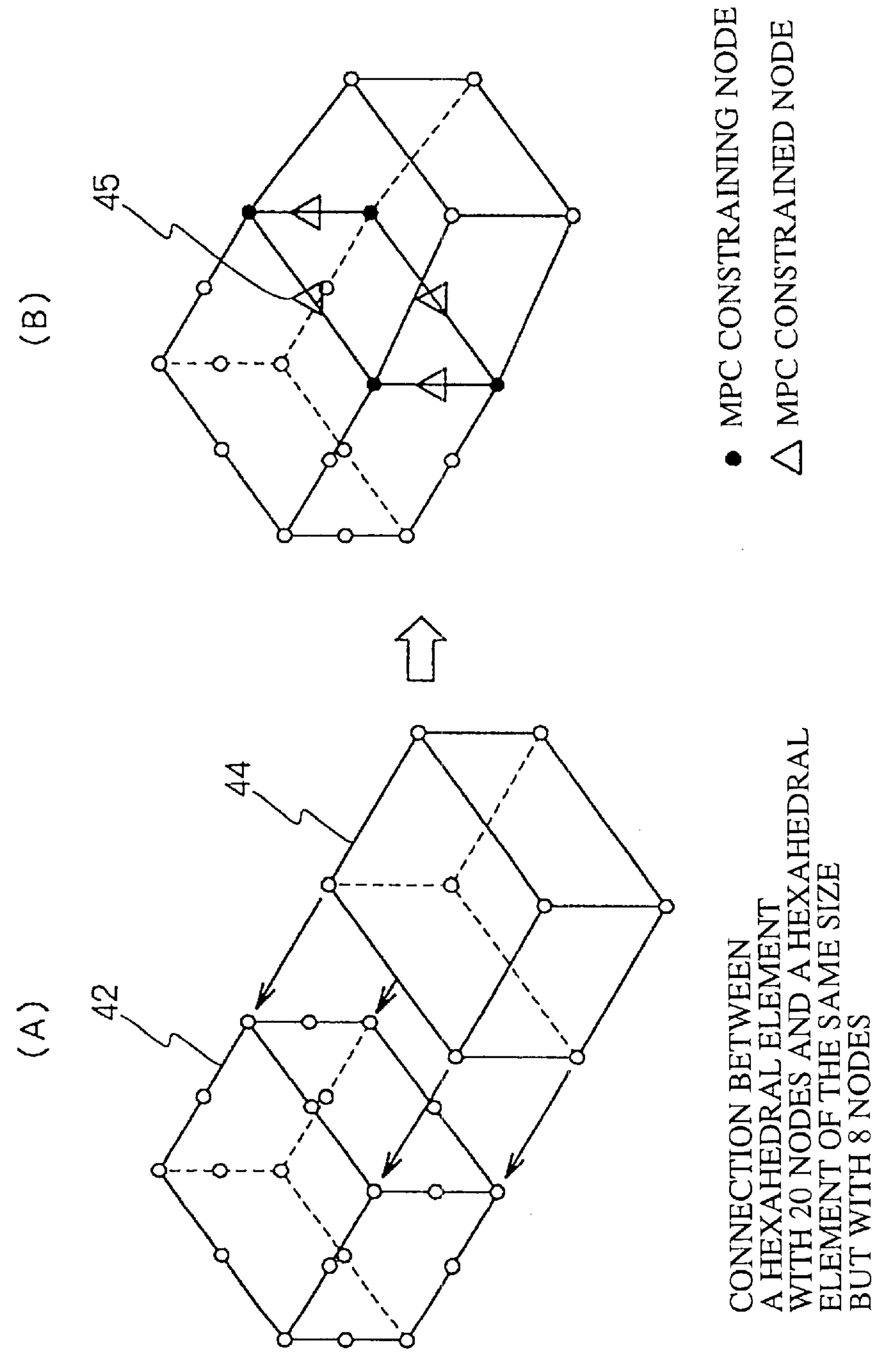
FIG. 19 explains an example of the application of MPC for both hexahedral voxels with 20 nodes and hexahedral voxels with 8 nodes. Part 19 (A) shows connection examples for each voxel; Part 19(B) shows both the nodes that are used for MPC application and the other nodes for which MPC is applied.
Figure 20:
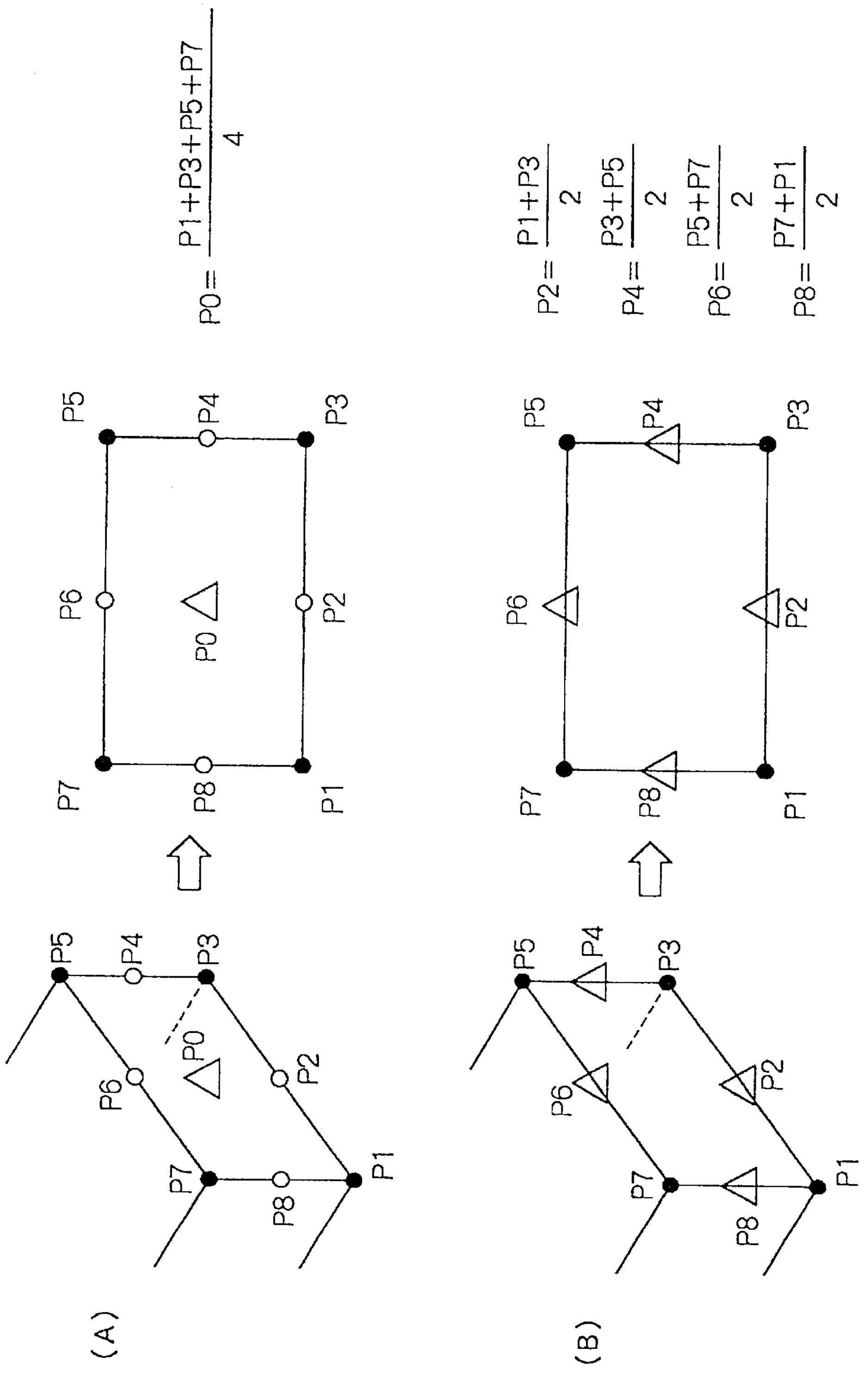
FIG. 20 explains an example of MPC application. Part 20(A) shows an example of MPC application for the nodes in the center; Part 20(B) shows an example of MPC application example for the nodes at the edges FIG. 21 explains an example of voxel data used in the present invention.

As seen in FIG. 19, in the case of connecting hexahedral elements with 20 nodes at the same level to hexahedral elements with 8 nodes, MPC is applied for the nodes at each edge of the hexahedral elements with 20 nodes at each endpoint at the edge as shown in FIG. 20(B).

If necessary, MPC can be applied for the nodes at the edge besides both cases shown in FIGS. 18 and 19. For example, when hexahedral elements with 20 nodes are connected to the elements at a level that is 1 level apart, MPC can be applied. Floating the nodes at each edge of a hexahedral element with 20 nodes can be prevented.

The node at the center connected to any element may be constrained with 4 nodes in 4 edges surrounding the node in the center, which causes a reduction of the accuracy, compared with the accuracy obtained in the example shown in FIG. 20(A). An analytical model is obtained by checking the connection of a large rectangle to a small rectangle, followed by using a hexahedral element with 20 nodes as a large rectangle connected to a small rectangle, then applying MPC for a node at the center.

In the case of connecting one rectangle to another rectangle at 1 level higher or lower, the elements can be connected to each other using both a hexahedral element with 20 nodes and MPC (in the case of connecting one rectangle to another rectangle at a level that is 2 or more levels apart, no satisfactory connection results). When octree data are obtained from voxel data, one is prevented from obtaining any rectangle for an element that is 1 level higher or lower than that of its neighboring element. If all of the 8 rectangles at the lower level are located inside of the shape but the parent rectangle is not located in the shape, or if the parent is located inside of the shape, with a rectangle at a level that is 2 or more levels apart being obtained as a neighbor, the method using the parent rectangle, which is not located in the shape, is used.

Analytical model data obtained in the application example consist of a hierarchical structure consisting of a first level voxel located at the boundary between the inside and the outside of the shape of the above-mentioned object of analysis, a second level voxel connected to the first level voxel and wider than the first level voxel, and an n-level voxel connected to the m-level voxel and wider than the m-level voxel. This hierarchical structure stores the n-level voxel that holds a midpoint node defined at the edge of the n-level voxel, a middle node defined at the center of the surface connected to the m-level voxel, middle node constraining data used to constrain the middle nodes at each vertex on the surface, and other middle node constraining data used to constrain the middle nodes at each endpoint at the edge. Therefore, fewer amounts of elements are required while analytical accuracy is maintained.

The analytical model data may consist of hexahedral element data based on both the data that indicate the level of the hexahedral rectangle, which is to be added to voxel data and which is defined to be increased, such as an octree, toward the inside of the shape from the outermost part (boundary of the shape), and the other level data added to voxel data according to level-limiting aspects such as the distance from the boundary. The analytical model data may also consist of several midpoint data that are stored in the large hexahedral element defined when a hexahedral element is connected to another hexahedral element at a different level, as well as constraining data that constrain the midpoint data using the nodes surrounding the midpoint data. In the example, an analytical model matching the shape characteristics can be obtained by varying the level-limiting data.

Test Results

Figure 21:
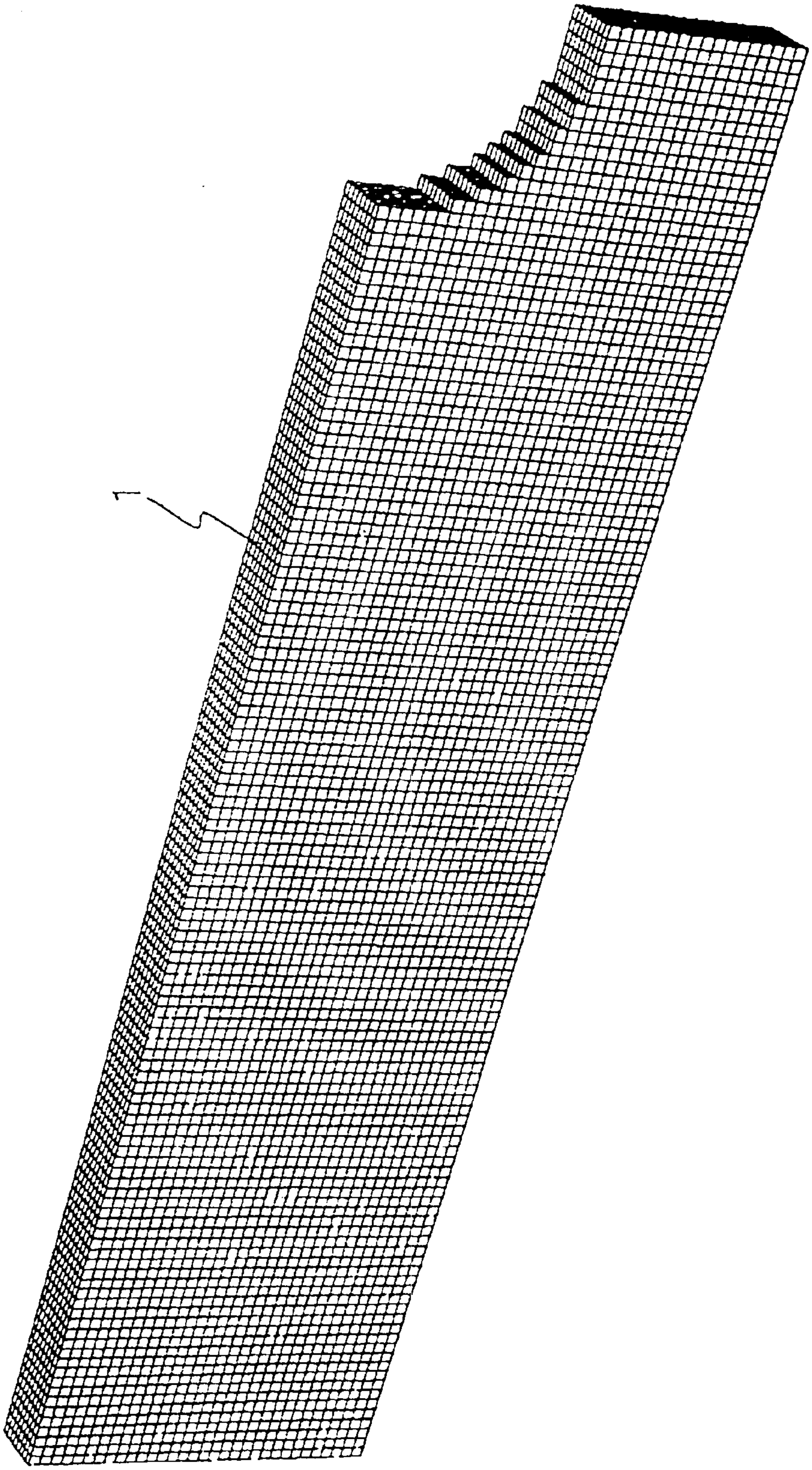
Figure 22:
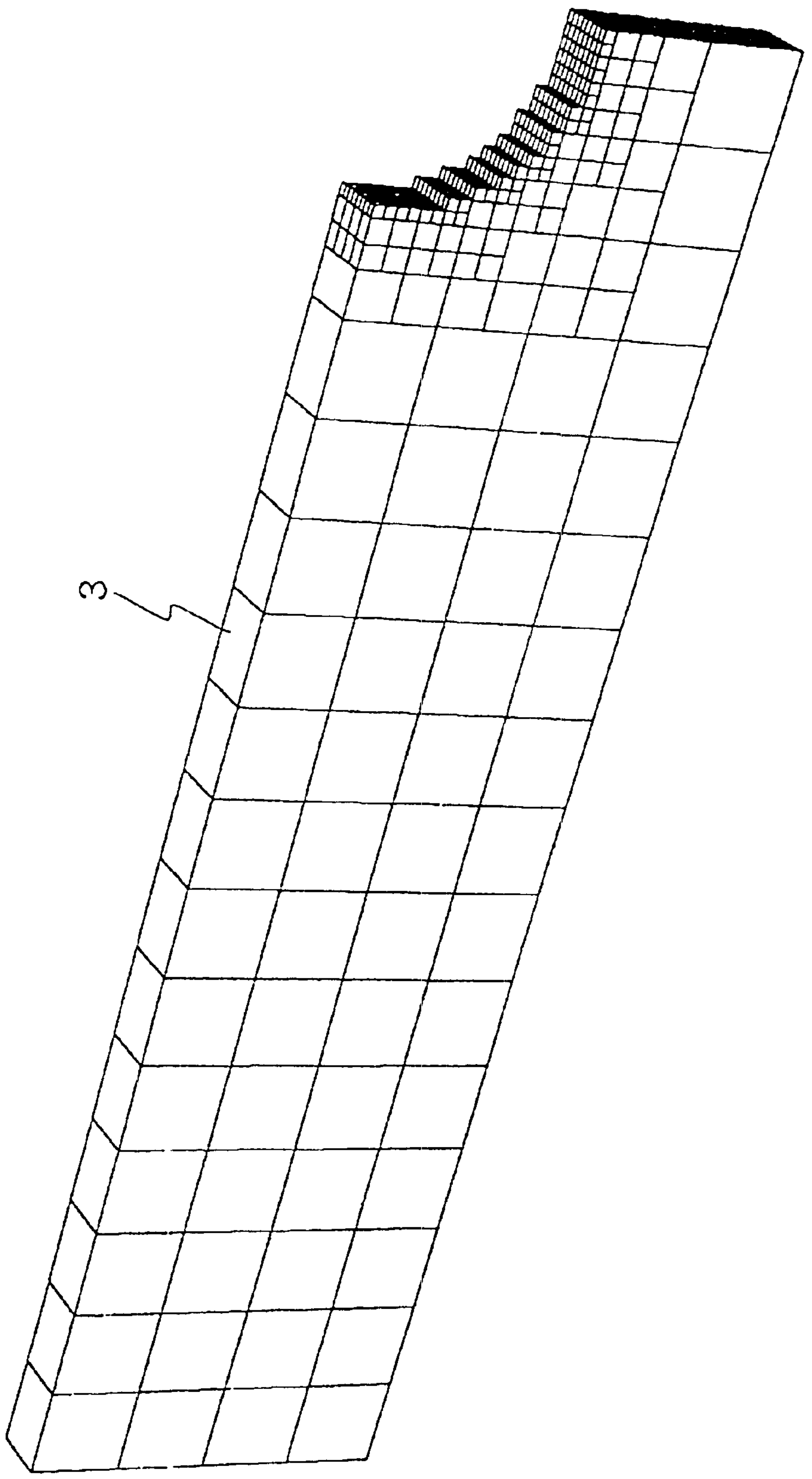
FIG. 22 shows an example showing octree data obtained from voxel data shown in FIG. 21.

FIG. 21 shows voxel data (number of rectangles: 64×16×32) obtained for a flat configuration with a cutout (model of a flat with a round hole reduced to ¼). FIG. 22 is a hard copy showing octree data obtained using the voxel data. It was seen in the case of octree data that the level of the rectangles was gradually (level by level) increased from the cutout, and no rectangle was connected to any other rectangle at a level that was 2 or more levels apart from the next one. Voxel data obtained with each rectangle that was a hexahedral element required 30624 elements. On the contrary, voxel data converted to octree data required 1000 elements. Therefore, the amount of elements was significantly reduced.

Figure 23:
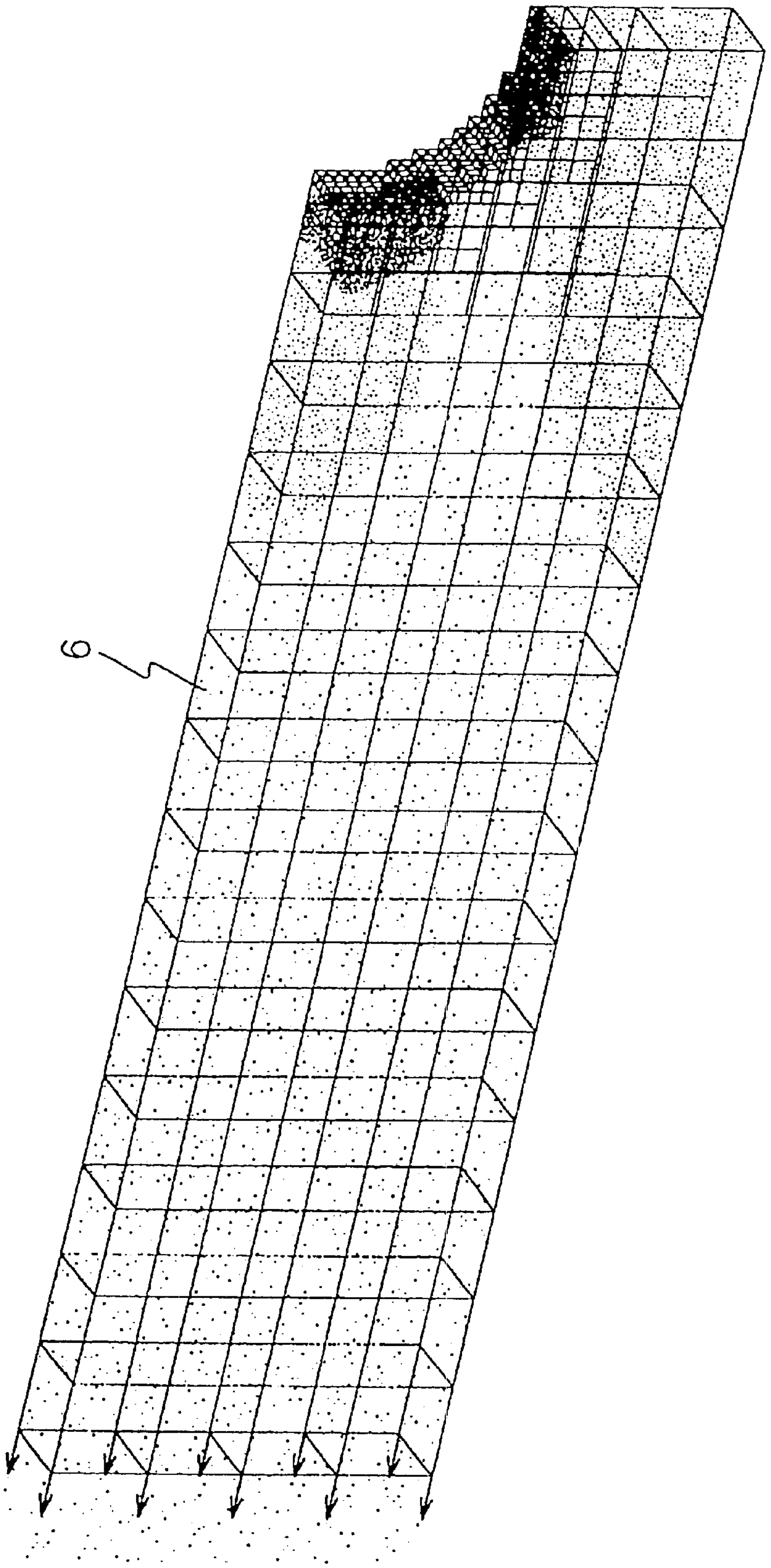
FIG. 23 explains an example of the analytical result obtained using analytical model data of the present invention.

Octree data were obtained by the method of the present invention using voxel data as shown in FIG. 21. FIG. 22 shows the octree formulation. FIG. 23 shows the result from analysis following the installation of octree data, shown in FIG. 22, in CAD/CAM/CAE Soft-IDEAS (analysis Solver) made by SDRC (U.S.A.). The analysis was based on the assumption that a flat band configuration with a round hole was elongated. The flat band was reduced to ¼ the size to make a model, considering the symmetry.

Figure 24:
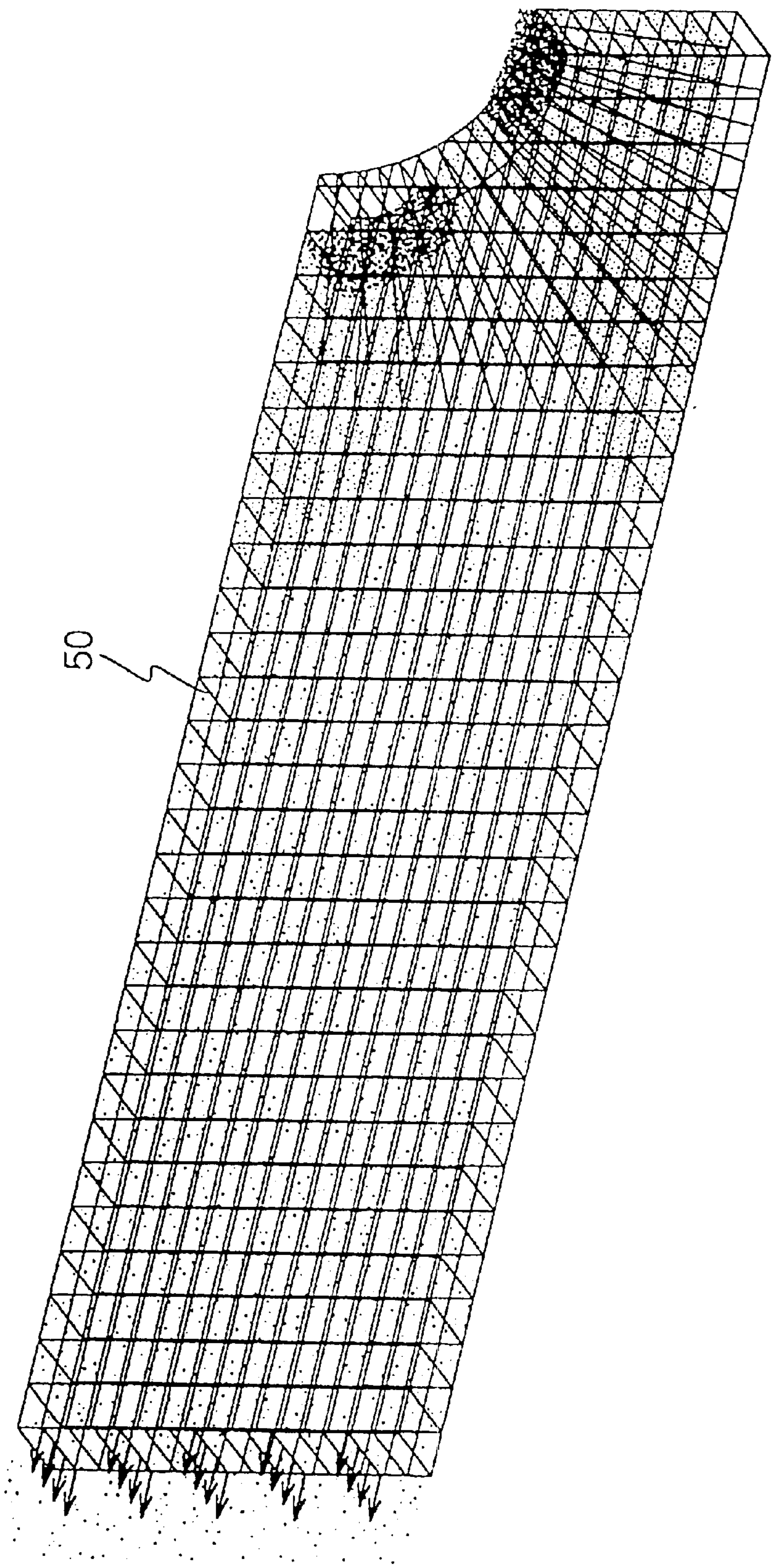
FIG. 24 explains an example of the analytical result obtained using analytical model data obtained by manually dividing the same shape shown in FIG. 23

A maximum main stress of 4.46 $mN/mm^2$ was obtained by analysis using the octree shown in FIG. 23. The theoretical value of the maximum main stress of 4.34 $mN/mm^2$ was obtained under the conditions that were given for the analysis. Therefore, the result from the analysis using octree data shown in FIG. 23 perfectly matched the theoretical value. The result from an analysis using hexahedral elements obtained by manual element division is shown in FIG. 24. A maximum stress of 4.38 $mN/mm^2$ was obtained. The result from the analysis using manual data is more similar to the theoretical value than the result from the analysis using the octree. However, since the result from the analysis using the octree was almost equal to the result from the analysis using the manual data, it was assumed that the result from the analysis using the octree was practical.

Because an analytical model is obtained using octree data in the present invention, fewer elements are required for the analytical model, compared with an analytical model obtained using voxel data. Analysis using a conventional processing unit is possible. Because octree data are obtained based on voxel data, the process is easier than the process used for the formulation of octree data using direct CAD data. The difference in level between the element and its neighboring element must be 1 level or less in octree data formulation. If there is a difference in level between one element and its neighboring element, the larger one is used as a hexahedral element with 20 nodes, so the connection between the elements of an analytical model can be maintained.

The present invention has the above-mentioned structure and functions. Because the connection is determined step by step from a voxel located at the boundary to that which is farthest inside in the connected voxel determination process, and because the smallest voxel located at the boundary is gradually increased for redefinition, based on the connection of the voxel, octree data are obtained using a voxel having the minimum size of the surface identical to the shape of an object of analysis. When voxel data shown in FIG. 21 are directly used as an analytical model, both 31240 elements and 36594 nodes are obtained. In the case of octree type analytical model data shown in FIG. 22, both 475 elements and 1355 nodes are obtained. Therefore, both the amount of elements and the amount of nodes can be significantly reduced. Because the level of the voxel is several times higher than the width of a rectangle, a good connection between voxels having different levels can be easily maintained. Because analytical accuracy can be maintained by constraining the nodes, analytical model data that can be used for highly accurate analysis using fewer amounts of elements can be obtained. The present invention provides both a method and an apparatus for excellent analytical model formulation.

What is claimed is:

1. A method for computing an analytical model, comprising the steps of:

reading voxel data for an analytical object defined by a group of rectangular parallelepiped voxels (voxel reading step);

determining whether each voxel is located in an inside, an outside, or an in-between boundary of said analytical object (boundary determining step);

determining by a plurality of sub-steps including a feedback sub-step whether each voxel determined to be in the inside is connected to other voxels that are determined to be located at the boundary in the previous step (connection determining step);

redefining a voxel that is determined to be in the inside in the boundary determining step as a new voxel which is larger than the boundary voxel (new voxel redefining step);

wherein said sub-steps of said connection-determining step comprise the steps of:

determining a hierarchical structure of voxels using a series of numerical designations from a boundary voxel that is determined to be located at the boundary in said boundary determining step (hierarchical structure determining step); and defining a voxel that is determined to be in an upper level of the hierarchical structure in the previous hierarchical structure determining step as a parent voxel and a voxel that is determined to be in an immediately lower level of the hierarchical structure in the previous hierarchical structure determining step as a child voxel (parent-child defining step), and wherein said new voxel redefining step comprises the steps of:

redefining a parent voxel that corresponds to child voxels which are determined to be in the inside of the analytical object in said boundary determining step and which are next to the boundary voxel determined to be in the boundary of the analytical object in said boundary determining step as a second level voxel that has a twice as wide as the child voxel (first second-level hierarchical redefining step);

redefining another parent voxel that corresponds to child voxels which are surrounded by said second level parent voxel or a child voxel that is determined to be in the inside of the analytical object in said boundary determining step as another second level voxel that has a twice as wide as the child voxel (second second-level hierarchical redefining step).

2. The method for computing an analytical model of claim 1, wherein said new voxel redefining step comprises the steps of:

defining a node of the child voxel on a face or an edge of the parent voxel defined in said first and second second-level hierarchical redefining steps (node defining step); and applying a constraint condition based on other nodes to the node defined in the previous step.

3. The method for computing an analytical model of claim 1, wherein said new voxel redefining step further comprises the steps of:

defining said parent voxel as a hexahedron element with 20 nodes including a midpoint node on each edge; and defining a node at the center of the connection face to the child voxels as a central node of the parent voxel (parent-child node defining step).

4. The method for computing an analytical model of claim 1, wherein said new voxel redefining step further comprises the steps of:

applying a constraint condition that constrains said central node by each vertex on the connection face to said central node defined in said parent-child node defining step; and applying a constraint condition that constrains the midpoint node by both end nodes of the edge to the midpoint node.

5. A method for computing an analytical model comprising the steps of:

reading voxel data for an analytical object defined by a group of rectangular parallelepiped voxels (voxel reading step);

determining whether each voxel is located in an inside, an outside, or an in-between boundary of said analytical object (boundary determining step); and determining in manner of hierarchy and feedback whether each voxel determined to be in the inside is connected to other voxels that are determined to be located at the boundary in the previous step (connection determining step);

wherein said connection-determining step further comprises the steps of:

setting a first level value in all voxels corresponding to said voxel data in said voxel reading step except voxels which are determined to be in the outside of said analytical object (first level setting step);

setting a level counter, L, to an initial value;

performing a first sequence comprising the steps of:

(A) extracting a group of voxels which are contained in a cube having a width $2^L$ as large as the voxel set in the first level setting step from the voxels set the first level value in the first level setting step;

(B) setting a second level value, wherein the second level value is equal to the value of the level counter plus one, in the extracted voxels except a group of voxels which are contained in the cube with the width $2^L$ as large as the voxel set in the first level setting step but at least one of which is a boundary voxel (second level setting step);

(C) incrementing the level counter by one; and (D) determining whether the level counter has reached a maximum value;

repeating steps (A) through (D) in response to determining that the level counter has not reached the maximum value; performing a second sequence in response to determining that the level counter has reached the maximum value, comprising the steps of:

outputting the octree data to a display device; and writing the octree data as an analytical model to a file.

6. A device for computing an analytical model, comprising:

a means for reading voxel data for an analytical object defined by a group of rectangular parallelepiped voxels;

a boundary determining means for determining whether each voxel is located in an inside, an outside, or an in-between boundary of said analytical object;

a connection determining means for determining in a plurality of hierarchies recursively whether each voxel determined to be in the inside is connected to other voxels that are determined to be located at the boundary by the boundary determining means;

a means for redefining a voxel that is determined to be in the inside by the boundary determining means as a new voxel which is larger than the boundary.

7. A storage medium storing an analytical model formulation program, wherein said analytical model formulation program comprises:

a reading command for reading voxel data for an analytical object defined by a group of rectangular parallelepiped voxels;

a boundary determining command for determining whether each voxel is located in an inside, an outside, or an in-between boundary of said analytical object;

a connection determining command for determining by a plurality of sub-steps including a feedback sub-step whether each voxel determined to be in the inside is connected to other voxels that are determined to be located at the boundaryby the boundary determining command; and a redefining command for redefining a voxel that is determined to be in the inside in the boundary determining command as a new voxel which is larger than the boundary voxel;

wherein said redefining command further comprises:

a midpoint node defining command for defining midpoint nodes on an edge and a face of the redefined voxel which is connected to smaller voxels; and a node constraint command for constraining the defined midpoint node by nodes surround said defined midpoint node.

8. A storage medium storing analytical model data read by a computer used for structural analysis of an object, wherein said analytical model data comprises:

a first level voxel which belongs to a boundary between an inside and an outside of said object in a first hierarchy;

a second level voxel which is connected to said first level voxel and has twice long width as that of the first level voxel in a second hierarchy; and an 'n'th level voxel which is connected to an 'm'th level voxel and has twice long width as that of the 'm'th level voxel in an 'n'th hierarchy, wherein said 'n'th level voxel comprises:

a midpoint node defined on an edge of said 'n'th level voxel;

a central node defined at a center of a face of said 'n'th level voxel which is connected to said 'm'th level voxel;

a central node constraint data which constrains said central node by each vertex of said face; and a midpoint constraint data, which constrains said midpoint node by both end nodes of said edge.

9. A storage medium storing analytical model data which is read by a computer used for structural analysis of an object and has a plurality of hexahedron elements, wherein said analytical model data comprises:

a plurality of voxel data setting a boundary between an inside and an outside of said object as an outermost layer;

a level data which indicates a number of level showing a size of a hexahedron and is plugged into each voxel data in a defined larger hexahedron unit in a manner of octree as going towards inside of said object from said outermost layer;

a hexahedron element data determined in relation with a level data plugged into said voxel data according to a level restriction data of a distance from said boundary;

a plurality of midpoint data of a defined larger hexahedron element which is connected to a smaller hexahedron element;

a constraint data that constrains said midpoint data by surrounding nodes.

* * * * *